US012590772B2

(12) United States Patent
Molinengo

(10) Patent No.: US 12,590,772 B2
(45) Date of Patent: Mar. 31, 2026

(54) METHOD AND SYSTEM FOR SENSING, MONITORING, LOGGING AND TRANSMITTING EVENTS THAT IS ASSEMBLED ON A FIREARM

(71) Applicant: ICondor LLC, Miami Lakes, FL (US)

(72) Inventor: Fabián Molinengo, Santa Fe (AR)

(73) Assignee: ICondor LLC, Miami Lakes, FL (US)

( * ) Notice: Subject to any disclaimer, the term of this patent is extended or adjusted under 35 U.S.C. 154(b) by 138 days.

(21) Appl. No.: 18/686,546

(22) PCT Filed: Aug. 25, 2022

(86) PCT No.: PCT/US2022/041450
§ 371 (c)(1),
(2) Date: Feb. 26, 2024

(87) PCT Pub. No.: WO2023/028185
PCT Pub. Date: Mar. 2, 2023

(65) Prior Publication Data
US 2025/0130015 A1      Apr. 24, 2025

(30) Foreign Application Priority Data

Aug. 27, 2021    (AR) ............................ P20210102426

(51) Int. Cl.
*F41A 17/06*         (2006.01)
*F41C 33/02*         (2006.01)
(Continued)

(52) U.S. Cl.
CPC ............ *F41A 17/063* (2013.01); *F41A 17/06* (2013.01); *F41C 33/029* (2013.01); *G08B 25/10* (2013.01); *H04W 4/027* (2013.01); *H04W 4/38* (2018.02)

(58) Field of Classification Search
CPC ........ F41A 17/00; F41A 17/06; F41A 17/063; F41A 17/066; F41A 35/00; H04N 5/232; H04W 4/02; H04W 4/22
See application file for complete search history.

(56) References Cited

U.S. PATENT DOCUMENTS 8,339,257 B2    12/2012  Cazanas et al.
8,819,979 B2     9/2014  Kelly
(Continued)

*Primary Examiner* — Van T Trieu
(74) *Attorney, Agent, or Firm* — The Webb Law Firm

(57)      ABSTRACT

An IoT system for sensing, monitoring, logging and transmitting events that is assembled on a firearm and the holster of said firearm, made up of at least two IoT modules, wherein a first IoT module is located in the firearm and a second IoT module is located in the holster of the firearm. Said system further includes sensing, logging, storing, and transmitting the real-time (or near-real-time) location of the firearm and the user thereof in an ongoing manner, so as to be able to reconstruct the path of the firearm of interest over time. Transmitting the events selected from the set including data indicating the state of the firearm (holstered or drawn), battery charge of both modules, position of the firearm and the bearer thereof; direction of the firearm, firearm fired and the absolute orientation of each shot. In the presence of any of said events, storing in a non-volatile memory a preset time before and after the data of all the sensors before, during and after the event. Said log includes the encoding of the sensed data, the interleaving of said data and the encryption thereof.

18 Claims, 14 Drawing Sheets

(51) Int. Cl.
$$
\begin{array}{ll}
G08B\ 25/10 & (2006.01) \\
H04W\ 4/02 & (2018.01) \\
H04W\ 4/38 & (2018.01)
\end{array}
$$

(56)                    References Cited

U.S. PATENT DOCUMENTS

| | | | | |
|---|---|---|---|---|
| 9,752,840 | B1 * | 9/2017 | Betro | H04W 4/029 |
| 11,153,283 | B2 * | 10/2021 | Graber | H04L 9/0631 |
| 2011/0119979 | A1 | 5/2011 | Gussalli Beretta et al. | |
| 2014/0290110 | A1 | 10/2014 | Stewart et al. | |
| 2017/0003101 | A1 | 1/2017 | Madrid et al. | |
| 2019/0003804 | A1 * | 1/2019 | Deng | F41A 35/00 |
| 2024/0019224 | A1 * | 1/2024 | O'Dell | F41A 19/01 |

* cited by examiner 41        40

43

42

METHOD AND SYSTEM FOR SENSING, MONITORING, LOGGING AND TRANSMITTING EVENTS THAT IS ASSEMBLED ON A FIREARM

CROSS REFERENCE TO RELATED APPLICATIONS

This application is a United States National Phase of International Patent Application No. PCT/US2022/041450, filed Aug. 25, 2022, and claims priority to Argentine patent application Ser. No. 20210102426, filed Aug. 27, 2021, the disclosures of which are hereby incorporated in their entireties.

BACKGROUND OF THE INVENTION

Field of the Invention

This system is related to a forensic method and system for sensing, storing and transmitting data related to critical events in firearms with the capacity for monitoring and tracking in real or quasi-real time, and guaranteeing the integrity of this data throughout the entire system. The proposed method and system is intended to provide services to law enforcement agencies, as well as private security companies, sellers and owners of firearms, with the unique ability of real time tracking and guarantee of the integrity of the data on the firearms of interest.

Description of Related Art

Monitoring of firearms to enhance public safety, as well as to notify authorities (such as law enforcement departments, security guard agencies, or the like) of a firearm discharge or other dangerous situations involving firearms via a wireless communication network has been addressed in numerous patents, such as U.S. Pat. No. 8,339,257 and US patent application 2014/0290110.

U.S. Pat. No. 8,339,257 describes a firearm equipped with a wireless communication system to report the discharge of the firearm at a data centre terminal. The system is made up of a sensor that is coupled to the firearm holster, a position-determining GPS receiver, which is used to detect the discharge of the firearm, and a wireless transceiver to transmit messages indicating the occurrence and location of the discharge of the firearm. The detection system is implemented with an accelerometer to detect the characteristic movement of the discharge of the firearm, an antenna to receive GPS signals from the satellites and send SMS messages, a battery that can be recharged by movement of officers or guards, and an SMS-based communications system to send the location of the gun and the time the firearm was fired.

Another system improving the safety of firearms by monitoring wireless networks is described in patent application US 2014/0290110, which includes a sensor device mounted on a firearm. The sensor device includes a subscriber identity module (SIM) that communicates with a server through a communication channel of a wireless network. The sensor device is configured to enable/disable the firing mechanism in the firearm according to the instructions received by the SIM from the server. Movements and/or attempts to operate the firearm are monitored using an application that is executed on a mobile device, which receives data about the firearm through the communication channel of the wireless network. In addition, the device includes a rechargeable battery, so the firearm can be configured with a coupling port for an external power source that facilitates recharging the integrated battery. The firearm owner can be notified through the mobile app about the state of the battery.

The device is implemented through an embedded system that has a microcontroller and redundant memory (which stores an operating system), a non-volatile memory that stores data that allows the device to be uniquely identified (for example, an international mobile subscriber identity) and a related cryptographic key that is used to identify and authenticate a subscriber in a mobile phone network. The SIM memory can also store one or more unique serial numbers, a personal identification number (PIN), and a personal unlock code to unlock the PIN.

In operation, the SIM stores data about the state of the network, including a location area identity (LAI), which is updated whenever the SIM changes location. The SIM transmits the data from the sensor device to a cloud-based platform, which includes computer decision-making and a database of rule sets for data signaling, through a wireless network. The platform transmits the data received to a mobile device (such as a smartphone), which includes a firearms safety and monitoring application. The mobile device application allows the owner (or user) of the firearm to communicate with the sensor device to receive data on the state of the firearm, such as alerts produced by motion sensors embedded in the sensor device in response to movements of the firearm. The sensor device may also be enabled for the purpose of tracing the location of the firearm.

Another firearm safety system is described in U.S. Pat. No. 8,819,979, which has a built-in motion sensor interconnected to a gun. The motion sensor generates a signal that is transmitted to a communication device associated with the gun owner through a communication network. The motion sensor can be an accelerometer or any other device capable of detecting the movement of the firearm to which the safety module is interconnected, generating an electrical signal associated with the movement of the firearm. Various motion sensors of different types and orientation can be included in the safety module. A GPS receiver may also be included to generate signals indicating the location of the safety module and detect changes in the location of the firearm. The safety module further includes a trigger lock system, which can be locked or unlocked electronically and/or mechanically. When the trigger safety is unlocked (either in response to an electronic or manual command), the trigger lock system can generate an unlocked trigger signal. The trigger lock can also generate a "pull" signal when there is an attempt to pull the trigger despite the same being locked.

The controller can send trigger lock and/or unlock commands to the firearm. For example, the controller can send a lock command in response to a "movement detected" signal from the motion sensor or GPS receiver. The controller can send "lock" or "unlock" commands according to a preset time schedule, proximity of the user's communication device, and/or in response to signals received from the user (or another authority), either through an input/output device that can be included as part of the safety module, or through the communication device or the system server. The gun user (or gun owner) can also remotely lock or unlock the gun by accessing the system server using any Internet connected device.

When the safety module is removed from the firearm to which it is connected, the safety module can generate a "module removed" signal. A processor is built into the safety module to manage different aspects of the operation thereof.

The processor receives signals generated by the motion sensor, the GPS receiver, the safety module and/or trigger lock to convert the signals into messages, such as "movement detected", "position", "trigger unlocked", "trigger pulled", "registered user detected" when a registered user is near the safety module and "module removed", among others. The processor sends the messages to a transceiver module for transmission thereof to the communication device and/or system server. The processor may also produce an alarm signal emitted by an input/output device of the safety module in response to a movement signal from the motion sensor or GPS receiver, or in response to a "trigger pulled" signal from the trigger lock system.

The transmitting/receiving module enables communication between the safety module and other system components (such as a communication device and a system server) through the communication network. Examples of a suitable transmitting/receiving module include an IEEE 802.11 interface (i.e., a Wi-Fi interface), a cellular phone interface, a Global System for Mobile Communications (GSM) interface, a Bluetooth interface, a Wired Ethernet or similar. The communication network includes any network or combination of networks capable of supporting the transmission of messages and data from the safety module to a monitoring device (such as the communication device and/or the system server).

Although it is very useful and entails progress in the firearms safety approach of law enforcement departments or security agency personnel, there is still a need for more comprehensive intelligence data acquisition and coverage of situations in which law enforcement officers or security guards of commercial premises, as well as firearm owners, are forced to use their firearms.

The state of the art has not resolved either the provision of a firearms monitoring system by means of IoT that can be used for expert reports because the aforementioned devices and systems can be manipulated.

In this way, the present invention solves the problem of providing a method and system that allows the real time, or quasi real time, monitoring, of a firearm as well as the safekeeping and safe transmission of the monitored data, such that said data can be used as expert evidence.

SUMMARY OF THE INVENTION

The present invention solves the aforementioned problems by providing an IoT technology-based monitoring solution for a firearm, which in a first aspect relates to a firearm comprising a first IoT module to monitor critical events, wherein the IoT module comprises:
  a first sensor module comprising at least:
    a first position sensor configured to detect location data; and
    a first inertial sensor configured to detect acceleration and orientation data;
  a first processor module configured to determine a critical event of the firearm from a group of predefined events, based on the data detected by the first sensor module, wherein the group of predefined events comprises at least: firearm drawn and firearm fired;
  a first storage module configured to store the data detected by the first sensor module before and after the determined critical event for a pre-established period of time; and
  a first wireless communications module configured to transmit the events determined by the first processor module and the data stored by the first storage module.

In one of the embodiments of the invention, the first sensor module further comprises a proximity sensor configured to detect a distance above a preset threshold from a predetermined storage location of the firearm.

According to one of the embodiments of the invention, the first communications module comprises at least one transceiver selected between: Bluetooth and sub-gigahertz. Thus, advantageously, the invention enables near low-power, high-speed communications via Bluetooth to transmit data or pair the IoT module of the firearm with other IoT devices and, alternatively, sub-gigahertz communications to cover the eventual requirement to transmit data directly to remote servers.

Additionally, in one of the embodiments of the invention it is contemplated that the first communications module further comprises at least one transceiver selected from: Lora and Wi-Fi. Thus, advantageously, the invention can carry out long-distance transmissions in the absence of Bluetooth communication, in addition to using the detection of available wireless networks to refine the location data provided by the position sensor.

One of the preferred embodiments of the invention relates to a system for monitoring critical events of a firearm comprising the firearm described above and a holster for the firearm, wherein the holster for the firearm comprises a second IoT module comprising:
  a second sensor module comprising at least:
    a second position sensor configured to detect location data; and
    a second inertial sensor configured to detect acceleration and orientation data;
  a second processor module configured to determine a critical event of the firearm among a group of predefined events, based on the data detected by the sensor module, wherein the group of predefined events comprises at least: firearm drawn and firearm fired;
  a second storage module configured to store the data detected by the second sensor module before and after the determined critical event for a preset period of time; and
  a second wireless communications module configured to receive communications from the first IoT module and to transmit events determined by the second processor module and the data stored by the second storage module;
  wherein the first and second IoT modules are configured to be paired and maintain a communication channel between them.

Thus, advantageously, the pairing of the first IoT module of the firearm and the second IoT module of the holster of the firearm makes it possible to provide more complete and accurate data on the events by having more sensors.

In one of the embodiments of the invention, a remote central server is contemplated, wherein the wireless communications modules of the firearm and the holster are configured to establish a first low-power, high-speed communication between them, so that the communications module of the firearm transmits the events determined by the first processor module and the data stored by the first storage module to the communications module of the holster which, through a second wireless communication, in turn transmits them to the remote central server together with the events determined by the second processor module and the data stored by the second storage module. Thus, advantageously, the cooperative operation of both modules also increases energy efficiency, since in a pairing situation the energy consumption of the transmission through the communication channel between both modules (for example, Bluetooth) is much less than that required by the complete transmission to the central server, which is exclusively handled by the second IoT module of the holster.

Additionally, in one of the embodiments of the invention, a safety module is contemplated, arranged in at least one of the first IoT module and second IoT module, configured to encode, interleave and encrypt the data to be stored in the first and/or second storage module. Thus, advantageously, the data is protected and its integrity is guaranteed to be used, for example, as expert evidence.

According to one of the embodiments of the invention, at least one of the first sensor module and second sensor module comprises at least one sensor selected from: accelerometer, gyroscope, magnetometer and GPS.

According to one of the embodiments of the invention, at least one of the first storage module and the second storage module comprises three non-volatile backup memories.

According to one of the embodiments of the invention, the first and second IoT modules each comprise a power module with battery recharge by inductive charging. Thus, advantageously, both modules can be charged on a charging base, but in addition, the IoT module of the firearm can be charged from the holster when the firearm is in the holstered position.

Another aspect of the present invention relates to a method for monitoring critical events of a firearm by means of a first IoT module coupled to the firearm, wherein the method comprises the steps of:

detecting, by means of a location sensor of the first IoT module, location data of the firearm;

detecting, by means of an inertial sensor of the first IoT module, acceleration and orientation data of the firearm;

determining, by means of a first processor module of the first IoT module, a critical event of the firearm from a group of predefined events, based on the data detected, wherein the group of predefined events comprises at least: firearm drawn and firearm fired;

storing, in a first storage module, the data detected by the sensors before and after the determined critical event during a preset period of time; and transmitting the events determined by the first processor module and the data stored by the first storage module.

Additionally, according to one of the embodiments of the invention, detecting the location data of the firearm, further comprises logging, by means of a wireless communications module of the first IoT module, at least one available wireless network to select between WiFi, Bluetooth and LoraWan to complete the location data of the firearm.

In one of the embodiments of the invention, the steps of encoding, interleaving and encrypting the data to be stored in the first storage module by means of a first safety module are contemplated. Specifically, according to one of the embodiments of the invention, data encoding comprises using a Hamming code. Specifically, according to one of the embodiments of the invention, data encrypting comprises performing a symmetric encryption with a 128-bit long key with three different keys that change periodically.

In one of the embodiments of the invention, it is also contemplated to initiate the pairing of the first IoT module with a second IoT module coupled to a holster of the firearm and, in the event that said pairing is not completed, directly transmit the data from the first IoT module to a central server through a communication to select from: LoRa (1118), SigFox, Z-Wave, Haystack, NarrowBand IoT, Narrowband Fidelity, Ultra Narrow Band and/or cellular network. Thus, advantageously, in the event of unavailability of the IoT module of the holster due to battery depletion, distance, loss or any other technical eventuality, the IoT module of the firearm retains the ability to transmit data to the central server. Alternatively, in the event that the pairing is completed, it is contemplated to transmit the data from the first IoT module to the second paired IoT module through a low-power high-speed communication between them. Thus, advantageously, the battery of the IoT module of the firearm is preserved by taking advantage of the low energy requirement of low-power communication (for example, Bluetooth). Subsequently, the IoT module of the holster will transmit the data from the IoT module of the firearm to the central server.

Additionally, in one of the embodiments of the invention, it is also contemplated:

detecting, by means of a second location sensor of the second IoT module, additional location data;

detecting, by means of a second inertial sensor of the second IoT module, additional acceleration and orientation data;

determining, by means of a second processor module of the second IoT module, a critical event of the firearm from a group of predefined events, based on the data detected, wherein the group of predefined events comprises at least: firearm drawn and firearm fired;

storing, in a second storage module, the additional data detected by the sensors before and after the determined critical event during a preset period of time; and transmitting the events determined by the second processor module and the additional data stored by the second storage module to the central server.

Thus, advantageously, the monitoring data is more accurate as the data collected by the IoT module of the firearm is completed with the data collected by the IoT module of the holster, which basically reproduces the same data acquisition elements and processes.

In the event of detecting a loss of pairing between the IoT module of the firearm and the IoT module of the holster, one of the embodiments of the invention contemplates transmitting the data from each of the IoT modules to the central server independently.

In another aspect, the present invention provides an IoT system for sensing, monitoring, logging and transmitting events that is mounted on a firearm and the holster of said firearm, which contains at least two IoT modules, wherein a first IoT module is located in the firearm and a second IoT module is located in the holster of the firearm; wherein said system further comprises:

a. sensing, logging, storing, and transmitting the real-time (or near-real-time) location of the firearm and the user thereof on an ongoing manner, so as to be able to reconstruct the path of the firearm of interest over time;

b. transmitting the events selected from the set comprised of: data indicating the state of the firearm (holstered or drawn), battery charge of both modules, position of the firearm and the bearer thereof; direction of the firearm, firearm fired and the absolute orientation of each shot c. in the presence of any of said events, storing in a non-volatile memory a preset time before and after the data of all the sensors before, during and after the event; and wherein said logging comprises the encoding of the sensed data, the interleaving of said data and the encryption thereof.

Said IoT module mounted on said firearm executes the following method:

d. loading the operational parameters of the sensors, memories and transceivers;

e. reading the data available on the sensors;

f. performing an individual encoding of the data of each sensor to correct any possible errors that occur during transmission and storage;

g. performing an interleaving of data, generating a sequence of interleaved data;

h. protecting the confidentiality of the data by encrypting said interleaved data of the step e— i. storing the encrypted data in at least two backup memories;

j. transmitting said encrypted data through any of the transceivers available in the system wherein the transmitted data sequence is randomly chosen from the sequences generated in said step e—;

Wherein said sensors include: accelerometers, gyroscopes, magnetometers and GPS. Preferably, in said step c—the Hamming code or similar is used.

Said step e-comprises symmetric encryption with a 128-bit long key with three different keys that change periodically. In said step f—the data is stored in three non-volatile backup memories for subsequent retrieval.

In a preferred embodiment of the present invention, under normal operating conditions, said transmission of said step g—is performed through the Bluetooth transceiver. Under conditions wherein the firearm is not within reach of the user, said transmission of said step g—is performed through a Sub-GHz transceiver. Preferably, in said step g-said transmitted sequence is chosen by randomly selecting 2 bits from a 64-bit random number, which select the generated sequence.

In a preferred embodiment of the system of the present invention, said IoT module mounted in said holster, executes the following method:

a. loading the operational parameters of the sensors, memories and transceivers;

b. reading the data available on the Bluetooth transceiver, sensors and any other sensors of interest;

c. performing an individual encoding of the data of each sensor to correct any possible errors that occur during transmission and storage;

d. performing an interleaving of data, generating a sequence of interleaved data;

e. protecting the confidentiality of the data by encrypting said interleaved data of step d—;

f. storing the encrypted data in at least two backup memories;

g. transmitting said encrypted data through a WiFi transceiver, providing a wide range and a high transfer speed.

Wherein said sensors are selected from the set comprised by: accelerometer, gyroscope, magnetometer and GPS. Preferably, in said step c—the Hamming code or similar is used. Wherein, said step e—comprises symmetric encryption with a 128-bit long key with three different keys. In said step f—the data is stored in three backup memories. In said step g—the transmitted data sequence is randomly chosen from the sequences generated in said step e—.

Wherein said transmitted sequence is chosen by randomly selecting 2 bits from a 64-bit random number, which select the generated sequence.

Preferably, the sensing of the data is performed at high speed (1000 c/s), and it is recorded in a circular manner so that once an event has occurred, all the raw parameters are logged.

In a preferred embodiment of the system of the present invention, in the event of loss of custody of the firearm, both IoT modules transmit the sensed data to the base independently. In the presence of communication between the IoT modules of the firearm and the holster, the IoT module of the holster will be responsible for communicating the positions and behaviors of the firearm and the user, saving energy to the device in the firearm and the IoT module of the firearm will be at its minimum consumption (hibernating) and its battery will be recharged.

In the absence of communication between the IoT module of the firearm and the IoT module of the holster, the IoT module of the firearm will use an IoT network to communicate directly to the servers, asynchronously, data about its position and critical events, wherein said network is selected from the set comprised of LoRa, SigFox, Z-Wave, Haystack, NarrowBand IoT, Narrowband Fidelity, Ultra Narrow Band and/or cellular network.

In another preferred embodiment of the present invention, said IoT modules are electrically and mechanically isolated, the port connectors are installed on the PCB boards of the embedded systems, only accessible when the firearm and/or the holster are disassembled, so as to make them inaccessible to any attempt to violate the integrity thereof.

In a preferred embodiment of the present invention, said IoT module assembled on said firearm comprises:

a. a three-axis accelerometer b. a three-axis gyroscope c. a three-axis magnetometer d. a GPS e. a battery f. a wireless battery charger g. two USB ports installed on the PCB boards of the embedded systems and only accessible when the firearm and/or the holster are disassembled, h. a microcontroller i. an integrated circuit specifically designed for data processor j. LoRa, Bluetooth and Sub-GHz transceivers k. at least three Flash or Ferroelectric (FRAM) non-volatile memories, l. at least one near field communications (NFC-) device And said IoT module assembled on said holster comprises:

a. a three-axis accelerometer b. a three-axis gyroscope c. a three-axis magnetometer d. a GPS e. a battery f. a wireless battery charger g. two USB ports h. a microcontroller i. an integrated circuit specifically designed for data processing j. LoRa and Bluetooth transceivers k. at least three Flash or Ferroelectric (FRAM) non-volatile memories, l. at least one near field communications (NFC) device In another embodiment of the present invention, the software and hardware components are arranged as an embedded system that combines dedicated circuitry with microcontrollers of one or more layers within each IoT module.

BRIEF DESCRIPTION OF THE DRAWINGS

The terms Fig., Figs., Figure, and Figures are used interchangeably in the specification to refer to the corresponding figures in the drawings.

DESCRIPTION OF THE INVENTION

Figure 1:
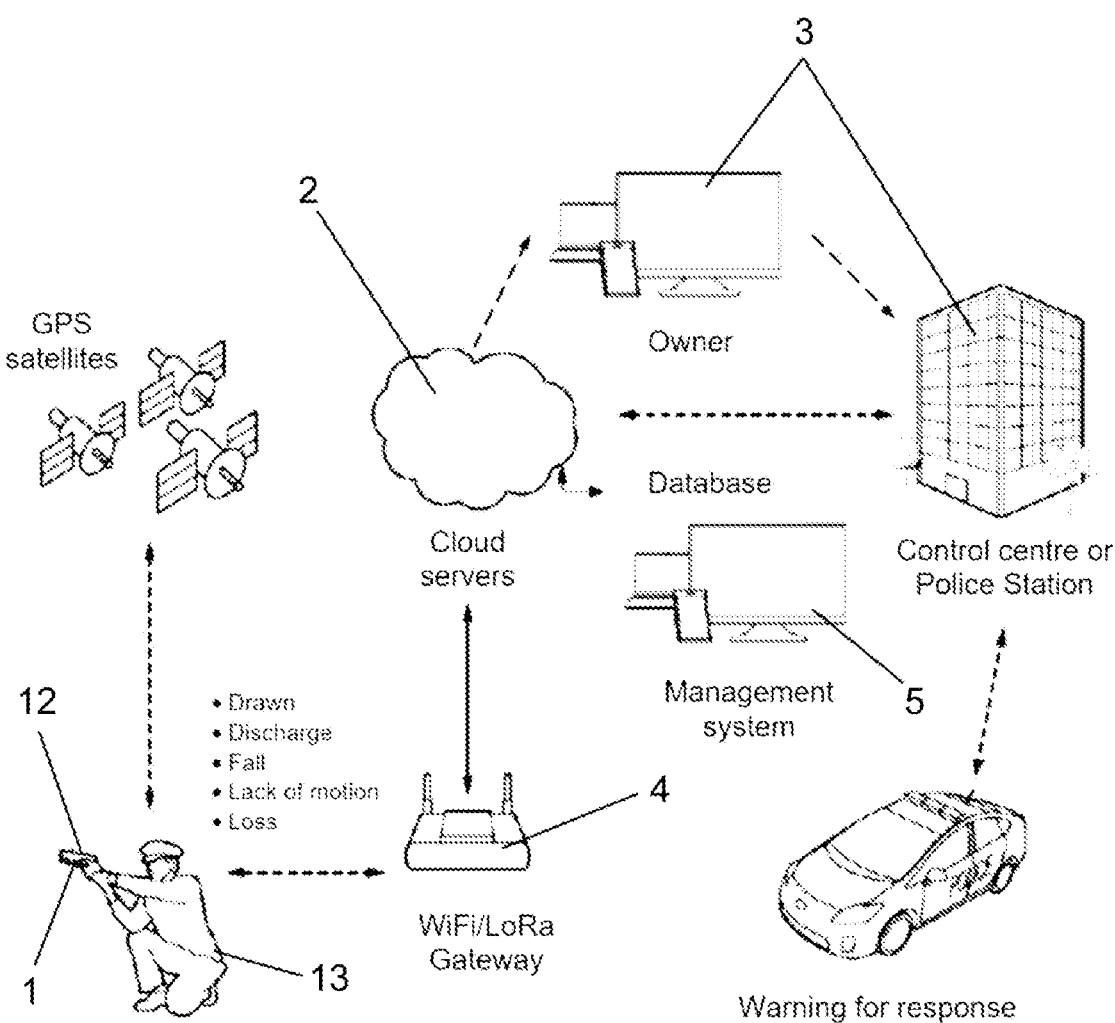
FIG. 1 is a block diagram representation of the IoT sensor module system for logging firearms.

The present invention relates to a method and system that enables sensing, logging, storing and transmitting events, sensed by IoT modules that are mounted on a firearm.

In the scope of the present invention, "events" relate to any type of change of state in the firearm, and/or the holster of the firearm, change of state being understood as the geographical position, the separation of the firearm from the holster (drawn), the state of the energy battery in the firearm and/or the holster, the direction in which the firearm is pointed, the number of discharges (shots) fired, the direction of the shots, the separation of the firearm from the user of the firearm (loss or theft of the firearm), and any other handling of the same.

An object of the present invention is a method for sensing, logging, storing and transmitting events, sensed by IoT modules assembled on a firearm and in the holster of said firearm. This method comprises steps of:

i. Determining, storing, and transmitting the real-time (or near-real-time) location of the firearm of interest, the holster of the firearm, and the user thereof on an ongoing manner so as to be able to reconstruct the path of the firearm of interest over time;

ii. Transmitting data indicating the state of the firearm (holstered or drawn), battery charge of both IoT modules (present in the firearm and in the holster), and position of the firearm and the bearer thereof. In the event of not having GPS data, logs from the WiFi, Bluetooth and LoraWan networks for the location thereof;

iii. If it is drawn, the behavior of the bearer and of the firearm (in the hand, on the waist, pointing forward or at the sky) is added to the above items;

iv. If there are discharges, it reports them and adds the absolute orientation in three dimensions of each discharge; and v. In the face of any event, it stores in a non-volatile memory a preset period of time before and after the data from all the sensors before, during and after the event.

vi. After storage thereof, the sensed, logged and stored data is encoded and encrypted.

The transmission of the data sensed, logged and stored by the firearm, occurs towards the IoT module of the holster, via Bluetooth, which logs and stores this data. The firearm can also transmit the data to a base through transmitters such as LoRa, or even WiFi.

The sensing is performed through a sensing module that collects data at high speed (1000 c/s), which is stored in a local non-volatile memory. The data is preferably recorded in a circular manner and the data sensed is processed by means of error correcting codes to preserve the integrity of the data during the storage and transmission thereof. Subsequently, the data is processed using encryption codes.

Preferably, the method of the present invention comprises sensing elements such as Inertial Measurement Units (IMU) equipped with a three-axis accelerometer to measure the acceleration forces applied to the firearm, which are processed to detect the discharge(s) of the firearm; a three-axis gyroscope to measure the rotational movements of the firearm with respect to the fulcrum thereof and a magnetometer to determine the absolute three-dimensional orientation of the firearm. The data from all three sensors is combined to measure the orientation (tilt angles relative to the ground) of the firearm when the firearm drawn event and/or a discharge event has been detected.

In a preferred implementation of the method of the present invention, the firearm comprises an IoT module located in an inaccessible portion without destroying or disassembling the firearm, for example, the grip; and a second IoT module is located in the holster of the firearm. Both modules are communicated and coordinated with each other, which makes it possible to determine if the firearm is drawn, or in the event that the distance from the holster is greater than the distance from the holster to the hand, this event is logged, stored and transmitted, as it may be due to a loss or theft of the firearm. The IoT module of the holster is responsible for logging the position and movements of the user of the firearm, wirelessly storing and relaying to a storage server and/or to the command centre, the data transmitted by the module housed in the firearm and that which is logged by the IoT module of the holster to provide end users with a real-time state of the firearm, such as alert notifications indicating changes in the state of the firearm and/or of the user of the firearm. Preferably, the IoT modules of the firearm and holster will communicate through a low-power high-speed network.

In another preferred embodiment, the method of the present invention collects and stores the data associated with the state of the firearm (detection and notification of the drawn, holstered, discharge event, number of discharges, spatial orientation and associated movements) before, during and after the time of discharge. This provides situational data that can be used in real time or near real time for subsequent crime scene analysis and/or as forensic evidence.

The present invention comprises a system with at least one device mounted on a firearm and another device mounted on the holster thereof, both equipped with sensing modules that make it possible to acquire complete data on the use, state, location, detection of critical events in the field of use of the firearm and the transmission of said data to the designated end users. Both devices have the ability to distribute intelligence and energy in order to optimize their autonomy and operability while communicating through low-power wireless networks used on the Internet of Things (IoT).

This system has at least two devices that work in a coordinated manner with sensing, processing, communication and energy and data storage capabilities, which distribute their sensing and transmission functions in an efficient and controlled manner according to the operational conditions. This arrangement allows two fundamental interrelated objectives to be met: energy savings and lower communication requirements, which results in the miniaturization of the device in the firearm and thus it is built into it without changing the experience of the user while bearing it.

Energy saving is achieved by implementing the algorithms combining dedicated digital circuits for the acquisition and processing of data (designed to minimize consumption and maximize safety), which are the tasks that consume most of the time and energy, with programmable digital circuits to implement device management and user interface, which are the most complex and least frequent tasks. Added to this is an asymmetric assignment of roles to the communication task: while the device found in the firearm only communicates with the holster, the latter is responsible for transmitting the data about the firearm and itself to the servers as the battery thereof can be larger than the size of the firearm.

In particular, the present system relates to an IoT sensor module that is assembled on (or operatively coupled to) a given firearm and another IoT sensor module in the holster containing it. These elements are configured to log, process and transmit data in real time, or near real time, giving knowledge to the end users (such as commanders, command centers, dispatch units, squad leader, etc.) about firearm-related events taking place in the field, and supporting the ability of end users to respond immediately to critical situations to improve public and personnel safety as well as operative efficiency.

The system of the present invention also addresses an IoT sensor module configured to capture and transmit data from the firearm through two possible paths. It will first try to communicate with the IoT sensor module in the holster using a low-power high-speed protocol such as Bluetooth Low Energy, and in the event of losing this connectivity, it will do so over a wireless IoT network such as LoRa, SigFox, Z-Wave or any other.

As long as there is communication between both devices (firearm and holster), whether or not the firearm is holstered in the holster, the device of the holster will be in responsible for communicating the positions and behaviors of the firearm and the agent, saving energy to the device in the firearm. While the firearm is holstered in the holster, the device associated with it will be at its minimum consumption (hibernating) and its battery will recharge if required. In the event that the devices of the firearm and the holster lose connectivity, the device of the firearm will use an IoT network to directly, and asynchronously, communicate its position data and critical events to the servers. The IoT network used for this task can be a Low Power Wide Area Network (LPWAN), based on wireless communications platforms such as LoRa, SigFox, Z-Wave, Haystack, NarrowBand IoT, Narrowband Fidelity, Ultra Narrow Band and/or cellular network, to provide real-time, or near real-time, alerts to the end users (via an app) about ongoing critical events in the field (which may include an event when a firearm is drawn, discharged, as well as loss of chain of custody of a firearm and other emergency situations).

Furthermore, the present invention is aimed at an IoT sensor module, the hardware/software components of which are arranged as an embedded system combining dedicated circuits with microcontrollers of one or more layers (or any other arrangement that enables each individual component to act in concert to perform the functionality described in this document) that is located within the enclosure of the sensor module, which can be assembled on a firearm, either within an accessory of the firearm, or directly on an accessory rail (such as the Picatinny, Weaver MIL-STD-1913 or STANAG rail) or the barrel of the firearm. This board is inaccessible both mechanically and electrically, this distinctive feature makes the system immune to hacks or changes in data.

The present invention is aimed at the IoT sensor module equipped with interrelated hardware and software components (sensor module) underlying the operational interrelation of the hardware components and the computational aspect of the sensor module to perform a variety of functions including, but not limited to: (a) detecting lack of mobility, (b) free fall, (c) use on the waist and (d) use in the hand; (e) detecting an event; (f) logging the orientation (angle/direction of the shot) of the firearm at the time of firing, as well as the number of discharges of the firearm when each event occurs, (g) logging the location of the firearm at the instant of each event, including drawing, holstering and/or discharging, (h) processing the data to guarantee the integrity thereof in case of errors, failures or hacking attempts; (i) transmitting, via IoT networks, the data indicating the unique identification, real-time or near-real-time location (acquired through the GPS receiver), and the orientation of the firearm, to a server that hosts a data repository and that is backed up by an end user application and accessible through an Internet-connected personal computer and/or mobile devices, (i) displaying WiFi, Bluetooth and LoRa networks around the same to achieve indoor positioning and (j) displaying alerts indicating the real-time or near-real-time location of the firearm when it is drawn/holstered and/or discharged, loss of chain of custody of the firearm, the directionality of a firearm and a trace navigation route of the firearm.

The present system is further aimed at the IoT sensor module that can be assembled on a firearm of interest and is capable of transmitting data to cloud-based servers, a back-end database, and API (application programming interface) through multiple devices and communication protocols and subsequently from the cloud-based servers to the application, which is operated by the end users.

The present system is also aimed at the IoT sensor module which includes an Inertial Measurement Unit (IMU) equipped with a three-axis accelerometer to measure the acceleration forces applied to the firearm, which are processed to detect the discharge(s) of the firearm; a three-axis gyroscope to measure the rotational movements of the firearm with respect to the fulcrum and a magnetometer to determine the absolute three-dimensional orientation of the firearm. The data from all three sensors is combined to measure the orientation (tilt angles relative to the ground) of the firearm when the firearm drawn event and/or a discharge event has been detected.

In a preferred embodiment of the present invention, the data is recorded at high speed (1000 samples/s) and is processed to avoid errors caused by problems in the devices (component and/or operation failures) or intentional modifications (hacking), following the required standards for a forensic expert report and in a circular manner so that there is reliable data before, during and after each event. In this sense, it is a system that, both at the data level and at the power supply level, is mechanically or electrically inaccessible, ensuring the integrity thereof, and that of the data, in a total manner.

In addition, the present invention is aimed at a fast wireless charging system that allows charging the device located on the grip of the firearm in a few minutes. This charging system uses the hollow of the bullet magazine for the purpose thereof, ensuring that there are no explosive loads (bullets) near the battery being charged, thus avoiding the risk of explosion in the event of expansion or heating.

Therefore, an object of the present invention is to provide a monitoring system to provide a comprehensive coverage of the state of the firearm and situational awareness in the field by detecting the event of drawing or holstering the firearm and/or discharge events, as well as the collection of data about the movements and position of the firearm in real time, ensuring the integrity of the data against system problems or intrusion attempts (hacking). The system is made up of two IoT sensor modules for data sensing, processing, storage and transmission; these IoT sensor modules log the state of the firearm and the holster in an ongoing manner, storing all the data and transmitting only that which is relevant to the situation. The modules work in a coordinated way to log and transmit all the logged data to the servers. One of the modules is assembled on (or operatively coupled to) a firearm of interest and the other is located in the holster of the firearm user.

Another object of the present invention is to provide an IoT sensor module installed in a firearm of interest, in order to collect and store the data associated with the state of the firearm (including the detection and/or notification of the drawn, holstered and/or discharge event and the number of discharges, as well as the spatial orientation (yaw, pitch, and roll) and associated movements (rotation, precession, and nutation) of a firearm before, during, and after the moment of discharge that provide knowledge of the situation in the field and crucial data that can be used in real time (or near real time) for subsequent analysis of the crime scene and/or as forensic evidence. The logged data is processed by the circuits of the IoT sensor module to guarantee the integrity thereof against its own problems (errors and failures) and hacking attempts.

Another object of the present invention is to provide an IoT sensor module for sensing, storing and transmitting data about the holster and the firearm it houses, while it is holstered. This device will be responsible for logging the position and movements of the user of the firearm, wirelessly storing and relaying, to a storage server and/or to the command centre, the data transmitted by the module housed in the firearm and that which is logged by the own module to provide end users (e.g. commanders, supervisors, superintendents, etc.) with a real-time (or near-real-time) state of the firearm and the user assigned thereto, as well as alert notifications indicating changes in the state of the firearm and/or user. In addition, it will scan the surrounding wireless networks (Bluetooth, WiFi and/or LoraWAN) to get a more accurate positioning of the modules location and when the firearm is holstered in the holster, it will recharge the batteries of the sensing module of the firearm. The two IoT sensor modules will communicate over a low-power high-speed network.

Another object of the present invention is to provide a sensing module to collect data at high speed (1000 c/s), which is stored in a local non-volatile memory. This data is recorded in a circular manner so that once an event has occurred, all the data generated by the sensors is logged, such as the position, accelerations, rotation speeds and orientation with respect to the magnetic North Pole and the g force in the three coordinate axes before, during and after critical events such as a discharge or fall of the firearm. This accurate data is essential so that the subsequent work of an expert can resolve complex situations.

Another object of the present invention is the processing of the data logged by the sensors of both modules, with error correcting codes to preserve the integrity of the data during the storage and transmission thereof, which could be affected by failures of the elements that make up non-volatile storage media (memories) or problems during data transmission (noise). In addition, the data is processed with encryption codes to preserve the integrity and privacy of the data during the storage and transmission thereof, which can be affected by hacking attempts or interception by third parties.

Another object of the present system is to assist the operation of a sensing module that includes an enclosure that can be mounted on a firearm (preferably on the grip), and the hardware components of the holster arranged in an embedded system and operationally interconnected to acquire and process firearms intelligence and to wirelessly transmit the data to designated recipients. These boards are electrically and mechanically isolated in order to make them inaccessible to any attempt to violate the integrity thereof and that of the data contained therein.

The IoT sensor modules include an Inertial Measurement Unit (IMU) configured to log linear accelerations, rotational speeds, and orientation relative to the magnetic north pole of the firearm and the g force when detecting critical events, such as movements that occur when drawing or firing a firearm, which allow determining the occurrence of one or more discharge events of the firearm and the associated ballistic parameters, producing at least one critical event detection signal. The IMU includes accelerometers to measure the acceleration forces applied to the firearm of interest, as well as the dynamic and static acceleration of the firearm of interest. Additionally, it includes gyroscopes to measure rotational speeds and magnetometers to measure absolute orientation with respect to the magnetic north pole and the g force of the firearm of interest. The IMU is configured to process the measured acceleration forces, rotational speeds, and absolute orientation of the firearm of interest to detect the discharge(s) of the firearm, and the general orientation of the firearm (firearm pointed at the sky or at the ground, free fall, lack of movement, etc.).

The IMU is also configured to analyze the direction of movement and tilt angle of the firearm at the instant of discharge based on the measured dynamic and static accelerations, rotational speeds, and absolute orientation with respect to the magnetic north pole and the g force of the firearm. The IoT sensor module further includes a battery and a wireless battery charging controller, integrated in the casing of the sensor module for battery cell charging.

The IoT sensor module installed on the firearm includes a proximity sensor for the detection of critical events, including drawn, holstered, loss of the firearm by the bearer, or removal of the firearm from a designated storage location, as in the case of a chain of custody. As a proximity sensor, a near field communication device (NFC) can be used, which is used to ensure that the firearm is within a predetermined distance from the person of interest (user or custodian). These types of devices use encrypted communications to link and exchange data.

The internal data storage unit may be implemented, for example, by a flash memory integrated circuit or ferromagnetic memory, as they are more reliable.

The IoT sensor module installed in the holster further includes magnetic sensors arranged in different places where the firearm is stored. The magnetic sensors detect the presence of the firearm in the holster and are activated in a predetermined sequence during holstering and a different one when the firearm is drawn. In this way, it is possible to determine which event is occurring (holstering or drawn). In addition, it is possible to determine any movement of the firearm that occurs inside the holster. A similar system can be used with the containers used in the chain of custody and storage of the firearm. These sensors will detect when the firearm is removed from the container. Finally, the combination of the data from the magnetic sensors and NFC devices (the data provided by the Bluetooth transceiver can be included) makes it possible to guarantee that the firearm is within a predetermined distance from the holster. If NFC Tags are built into the clothing of the user, it is even possible to determine the proximity of the firearm with the hands of the user or any position of interest.

A real time clock (RTC) unit and a Global Positioning System (GPS) receiver are built into the embedded systems installed in the firearm and in the holster to have temporal references of the sequence of events detected by the sensor modules, but that are coordinated at the same time. This time reference is used in transmission and storage to synchronize data. The RTC is periodically synchronized, or when there is a valid GPS reception, with the Universal Time (UTM) signal provided by the GPS receivers.

The IoT sensor module of the firearm further includes a Low Power Wide Area Network (LPWAN) transceiver and a Bluetooth transceiver. The data logged by the sensors is organized in packages, with corrective codes and encrypted, by the device and is transmitted to the sensor module of the holster, as long as they can communicate using the Bluetooth transmitter. This implies that the firearm is close, within an area predetermined by the parameters of the Bluetooth transceiver, to the module of the holster. When the firearm leaves this fast communication area, the module uses the LPWAN transceiver to communicate with the server, periodically transmitting the position thereof and storing the intelligence logged. This will allow the autonomy and the spatial range in which the firearm can be monitored to be increased.

The IoT sensor module of the holster further includes a Low Power Wide Area Network (LPWAN) transceiver and a Bluetooth transceiver. The Bluetooth transceiver is used to receive the data sent by the sensing module of the firearm. The data received and that which is logged by the sensors themselves of the module is organized in packages, with corrective codes and encrypted, by means of the device and is transmitted to the server using the LPWAN transceiver.

The system made up of the IoT sensor modules in the firearm and in the holster is configured with an underlying logic to execute the following methods:

vii. Determining, storing, and transmitting the real-time (or near-real-time) location of the firearm of interest and the user thereof on an ongoing manner so as to be able to reconstruct the path of the firearm of interest over time;

viii. Transmitting data indicating the state of the firearm (holstered or drawn), battery charge of both modules and position of the firearm and the bearer thereof. In the event of not having GPS data, logs from the WiFi, Bluetooth and LoraWan networks for the location thereof;

ix. If it is drawn, the behavior of the bearer and of the firearm (in the hand, on the waist, pointing forward or at the sky) is added to the above items;

x. If there are discharges, it reports them and adds the absolute orientation in three dimensions of each discharge; and xi. In the face of any event, it stores in a non-volatile memory a preset period of time before and after the data from all the sensors before, during and after the event.

The IoT sensor modules of the present invention have been designed with the purpose of providing end users (for example members of security forces, private security and military, among others) with the necessary data that enables them to have a high level of situational awareness so that they can successfully perform operations in a highly efficient manner from having the relevant data of the situation with timeliness, speed and accuracy.

One of the sensors that is built into the IoT module of the firearm is a motion sensor, among the preferred motion sensors are MEMS-based inertial measurement units (IMUs) and a GPS. The IMUs include accelerometers, gyroscopes and magnetic compasses in a device that enable the correction, based on signal processing (Kalman filter), of sensor errors and compensating for the effects of gravity. By analyzing and combining the corrected signals from the IMU it is possible to estimate the movements made by the firearm, as well as the attitude of the user while the firearm is used, the attitude referring to any handling activity concerning the firearm.

In a preferred embodiment of the present invention, the system is essentially made up of three portions: i) an IoT sensor module on the grip (parts that cover the butt of a firearm) of the firearm that logs, stores and transmits the movements and other relevant parameters of the firearm, ii) an IoT sensor module in the holster (or holster) that receives the data transmitted by the IoT sensor module of the firearm, logs the movements of the person bearing the firearm and relays all the data to a server/base, and iii) a base where the analysis of the data received from the IoT sensor modules of the firearm and the holster is performed to determine the state of the firearm and the person bearing it.

FIG. 1 presents the complete operation of capturing and transmitting the data generated by the IoT sensor modules installed in the firearms 12 and holsters 13 of firearm users. This figure shows the manner in which the data flows from the IoT sensor modules 1 to the servers 2 and from there to the people 3 using this data.

The data logged by the IoT sensor modules 1 is sent to cloud servers 2 via IoT communications links 4 (for example, LPWAN or LoRa paired with an Internet-enabled device) where it is safely stored. An application programming interface (API) 5 provides the assigned end users access to the data generated by IoT sensor modules in raw or processed form, in near real-time as well as notifications (via screen pop-ups, text messages, or email alerts) to the designated recipients (e.g., computer-aided dispatch, commanders, supervisors, superintendents, etc.) of any changes in state or critical events such as situations involving the draw of the firearm and/or removal of a storage device, and/or when a firearm is discharged.

FIG. 1 shows a high-level description of the situation when a critical event (firearm drawn, discharge, emergency activation, among others) is detected. The IoT sensor module of the holster captures the geolocation coordinates of the holster and the firearm and transmits the state of the firearm in real (or near real) time by tracking changes in state (i.e. critical events, if any) via an LPWAN, LoRa, and/or Bluetooth transceiver, when connected to an Internet-enabled device, such as a mobile phone, tablet, or personal computer (in a vehicle) that has a stable Internet connection and executes the mobile app installed therein.

The IoT sensor module of the firearm is synchronized with the IoT sensor module of the holster, which is synchronized with the mobile app that subsequently transmits data (geolocation coordinates and state of the firearm) to cloud-based servers. An Application Programming Interface (API) enables access to the data for further analysis. Once stored and secured, the data is displayed on any enabled device that has an end user application. Once the critical event alert is received by the end users or designated recipients, strategies can be developed and a unit can be dispatched to respond to the situation in the field.

The Internet of Things (IoT) is the network of physical objects (devices, vehicles, buildings, and other items) integrated with electronics, software, and network connectivity that enables these objects to log and exchange data. Each thing is uniquely identifiable through the integrated computing system thereof, but can interoperate within the existing Internet infrastructure. The IoT sensor modules of the firearm and the holster are considered as IoT objects herein.

The data collected by the IoT sensor modules is stored, processed, and displayed on the desktop, mobile, and/or web interface of end user applications. The data collected by the IoT sensor modules of the firearm and the holster includes a unique identification of the modules, the current state of the firearm and the holster, whether the firearm is holstered or not, or whether it is stored inside a storage container, a permanent geolocation of the user and the firearm when the draw and/or loss thereof is detected. The data also includes ballistic data (i.e., the angular position of the firearm and the trajectory of the bullet) when the firearm is fired. The acquired data is stored in the IoT sensor modules and communicated through a low power transceiver (LoRa, Bluetooth) or other wireless communications link to relay devices. These types of wireless telecommunications networks are designed to enable long-range communication at a low bit rate between connected objects, such as battery-powered sensors. There are numerous platforms available that implement this type of network, such as Haystack, LoRa, NB-IoT, NB-Fi Protocol, among others.

Figures 2A, 2B:
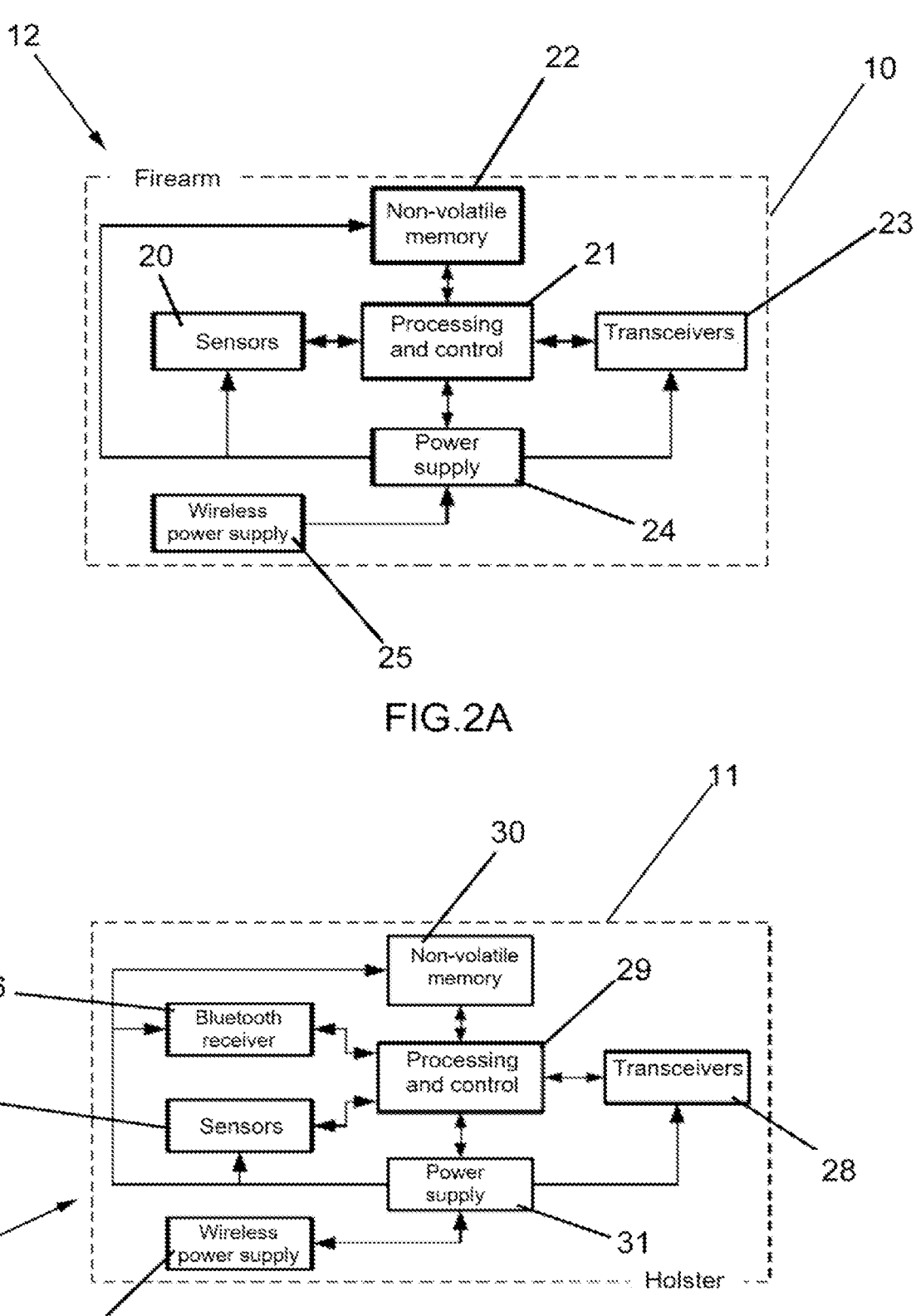
FIGS. 2*a* and 2*b* show block diagrams representation of the IoT sensor modules of the firearm and the holster.

FIGS. 2a and 2b presents the block diagrams of the IoT sensor modules 10, 11 of the firearm 12 (FIG. 2.a) and the holster 13 (FIG. 2.b) respectively. The structure of both IoT sensor modules is similar and they only differ in the sensors (the module 11 of the holster 13 includes a Bluetooth transceiver 26 to communicate with the module 10 of the firearm 12), the transceivers and the power supply system used. The IoT sensor module 11 of the holster 13 has batteries with a higher storage capacity, so this module recharges the battery of the IoT module 10 of the firearm 12 when it is holstered.

According to FIG. 2a, the block diagram of the IoT module 10 of the firearm 12 includes sensors 20, a processing and control module 21, a non-volatile memory 22, transceivers 23, a power supply module 24 and a wireless power supply module 25.

According to FIG. 2b, the block diagram of the IoT module 11 of the holster 13 additionally comprises a Bluetooth receiver 26 for communication with the module 10 of the firearm 12. It comprises a sensor module 27, own transceivers 28, a processing and control module 29, non-volatile memory 30 power supply module 31 and wireless power supply 32 slightly different due to size and inductive load capacity.

Figure 3:
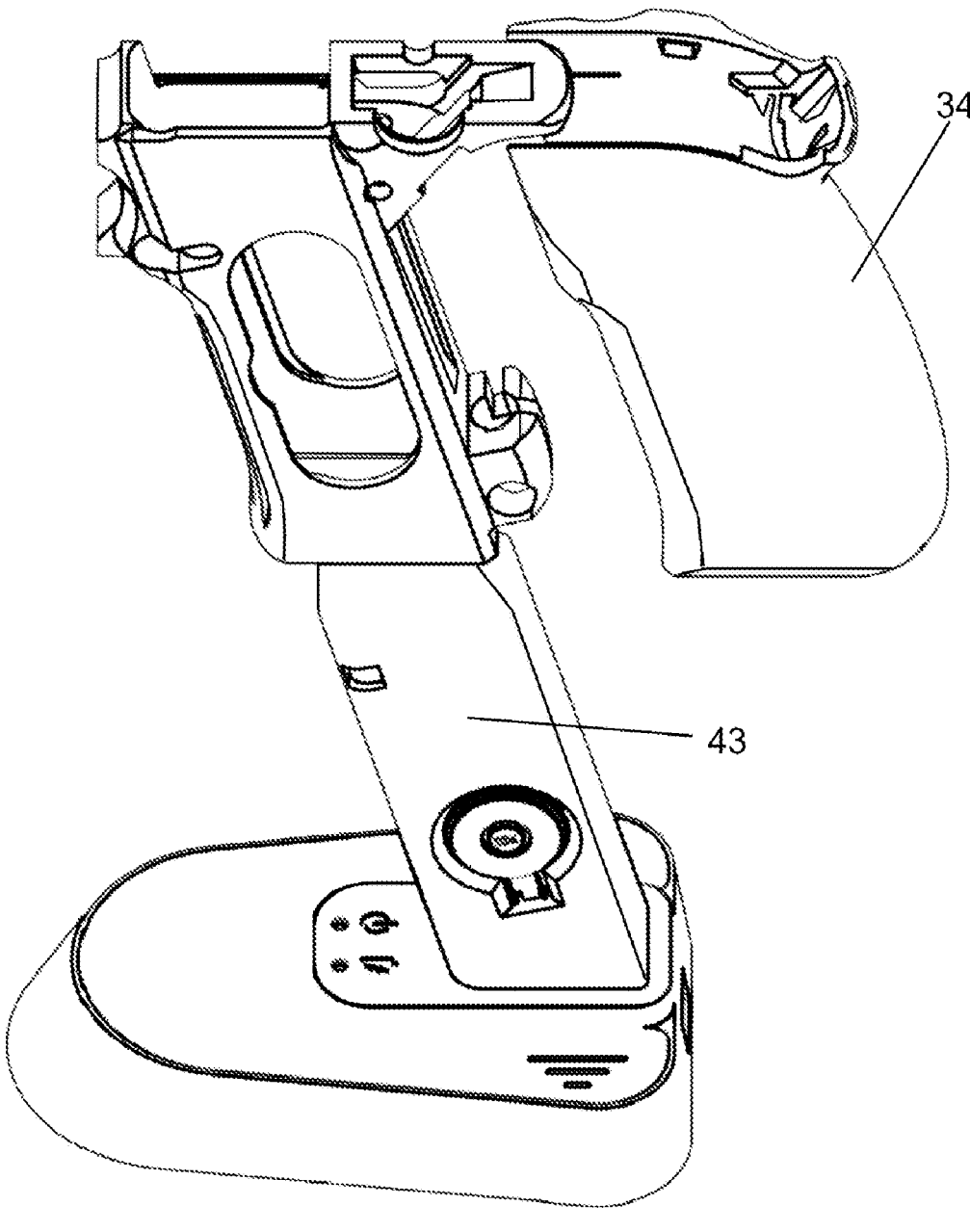
FIG. 3 is a perspective view of a firearm with the IoT sensor module.

FIGS. 3 and 4 show the way in which the IoT sensor modules of the firearm and the holster are built, as well as a possible way to mount them. The modules are housed in enclosures that house the electronic components of the IoT sensor modules of the firearm and the holster that are operationally interconnected to provide the intended functionality and may be implemented as an embedded system specifically designed for the purpose of guaranteeing the inviolability and/or hacking thereof.

The IoT sensor module of the firearm can be fixed or embedded inside the handgrip 34, covered by the grips (FIG. 3) and/or other firearm accessory, such as a hand guard, rifle stock, and vertical handgrip, among others. Alternatively, the IoT sensor module can be configured with external structural elements that can be compatible with the accessory rails or barrel of a firearm system. The IoT sensor module of the firearm can also be fixed to an accessory part, such as a Picatinny/Weaver/STANAG rail adapter.

Figure 4A:
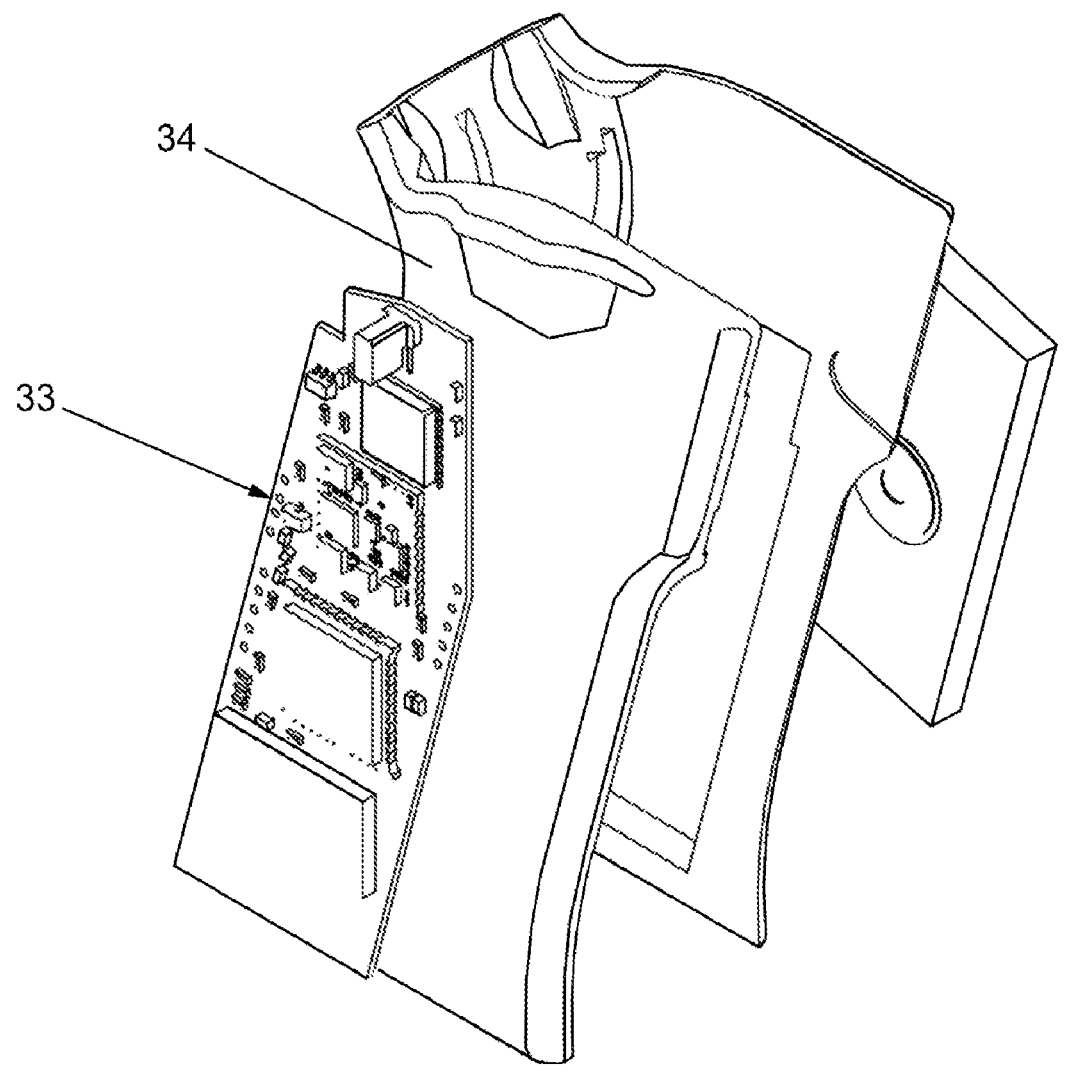
FIGS. 4*a*, 4*b* and 4*c* are a schematic representation of alternative installations of the IoT sensor module inside the firearm grip (FIG. 4*a*), the holster (FIG. 4*b*) and the battery charger (FIG. 4*c*)

FIG. 4a shows an embodiment of the IoT sensor module 10 of the firearm 33 embedded in the grip 34 of the firearm.

The IoT sensor module of the holster can be fixed or embedded in the holster of the firearm (FIG. 4) or be mounted in several modules on a belt or a multifunctional tactical vest, similar to accessories, allowing larger batteries to be carried, which increases the autonomy and operational range of the IoT sensor modules.

Figure 4B:
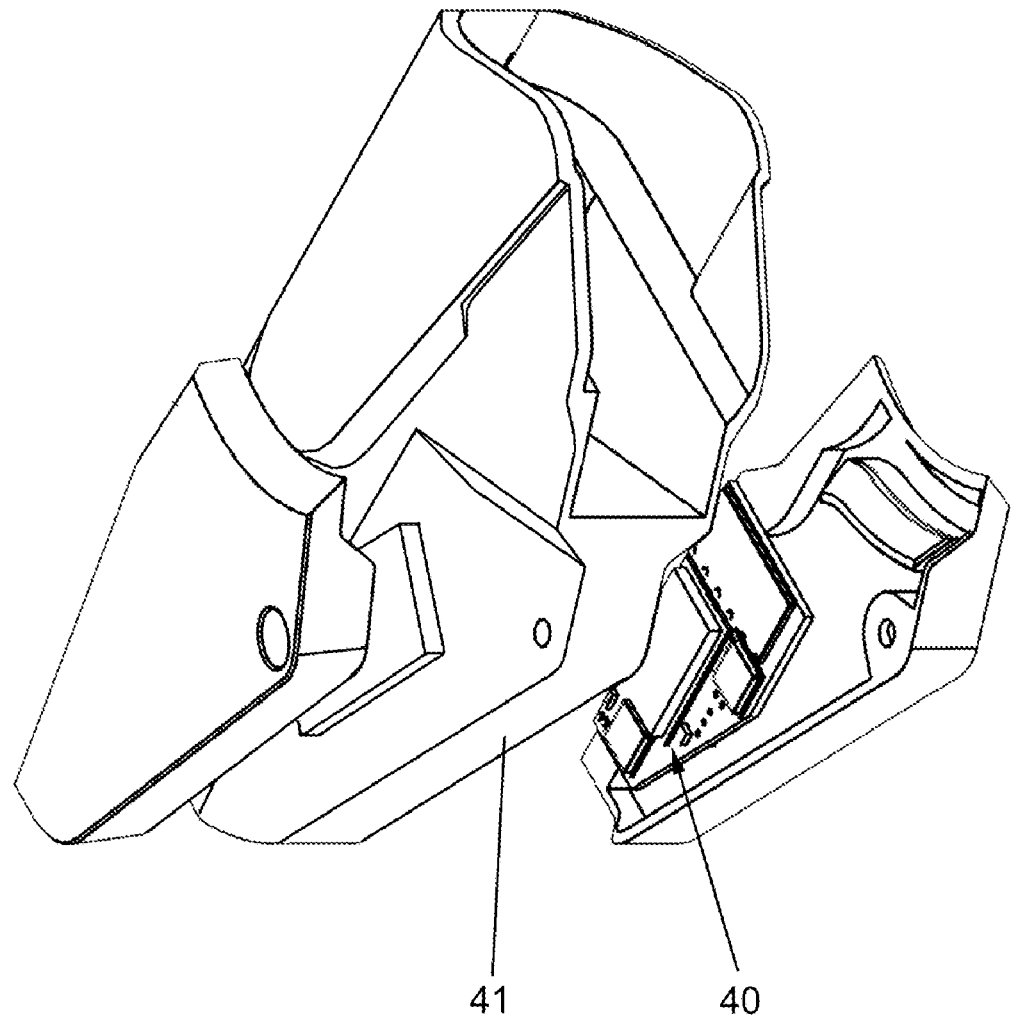

Specifically, FIG. 4b shows an embodiment of the IoT sensor module 11 of the holster 40 embedded in the holster 41.

Figure 4C:
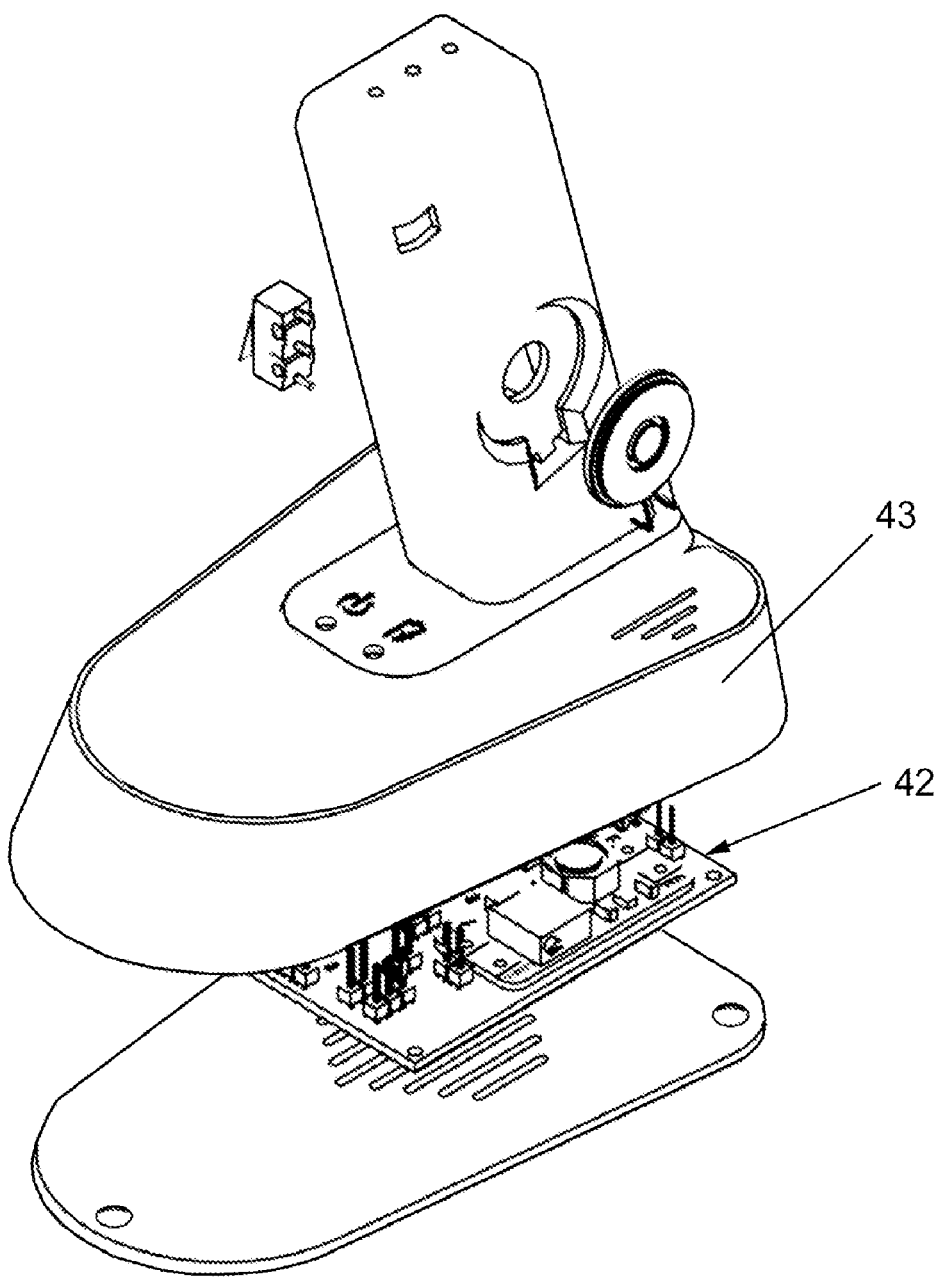

FIG. 4c represents an alternative embodiment wherein an IoT module 42 is embedded in a battery charger base 43.

Figures 5, 6:
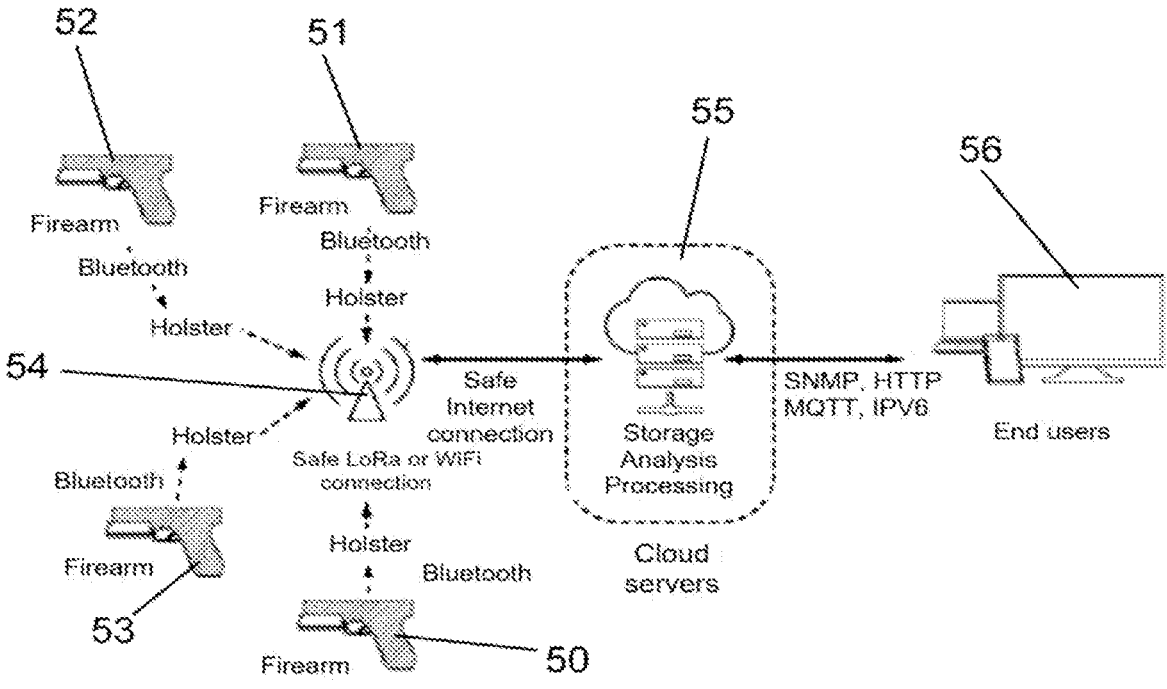
FIG. 5 is a schematic representation of the communication technologies and protocols used by the IoT sensor module system.
FIG. 6 is representative of the process and access to data collected by the IoT sensor module by an end user.

FIG. 5 presents the situation wherein various firearms 50, 51, 52, 53 equipped with the IoT sensor modules are connected to a router 54 (LoRa, ISM, Bluetooth, and WiFi, among others, which implement an IoT communications protocol) or communications links that are paired with the IoT sensor modules and are Bluetooth, WiFi, and LoRa-enabled, among others. The data transmitted by the IoT sensor modules through a secure Internet protocol to the cloud-based servers 55 are aggregated and stored in a safe database. The API processes copies of the original data (to ensure the integrity of the logged data) and sends the results to end user applications 56 via secure IP (via any of a variety of protocols, including Simple Network Management Protocol-SNMP-, Hypertext Transfer Protocol Secure-HTTPS-, MQ Telemetry Transport-MQTT-, Internet version protocol 6—IPv6—or a combination of these protocols). Subsequently, the end user application displays and manages the data (mobile and web-based applications).

FIG. 6 presents a representative diagram of the operation of the system in response to an event, the end users 60 (which are field officers, administrators, and other designated recipients of the intelligence and logged signals) use an end user application to access data related to the monitored firearm: the user thereof and the data logged by the IoT sensor modules. This data is stored in two related databases: i) The use database 62 that stores the history of the data on the use of the firearm (assigned user, date, period of use, etc.), and ii) the field database 63 that stores all the data logged by the IoT sensor modules of the firearm and the holster during use. Finally, the tracking database 64 stores the history of the technical data of each firearm and IoT sensor modules.

The use database 62 is updated by the managers, through user interfaces 61, assigning the users to the firearms used. This database can be linked to sensors at the storage location of the firearms to detect unauthorized removal of the same. The field database 63 is automatically updated with the data logged by the IoT sensor modules of each firearm 67 through the communication links 68, such as LoRa or Bluetooth, among others. When the firearm 67 is returned to the repository thereof, the data stored in the memories of the IoT sensor modules can be downloaded through its USB2 ports. This data can be used to verify the integrity and consistency of the data received through the network. The data downloaded from the modules is stored separately from the data received through the communication channels 68. The tracking database 64 is updated by the managers and the people responsible for the maintenance of the firearms. This database contains the data required to decrypt the data logged by the IoT sensor modules. This data is automatically stored in the database when the firearm is registered or repaired, using the USB1 ports of the IoT sensor modules.

The end user 60 accesses a copy of the data stored in the field databases 63 for processing, analysis and/or presentation thereof from an enabled device 65 which has the application installed. The tracking 64, use 62 and field 63 databases constitute the system database, which combined are the complete system back-end and application software.

The databases 62, 63, 64 are implemented on cloud servers 66.

Figure 7:
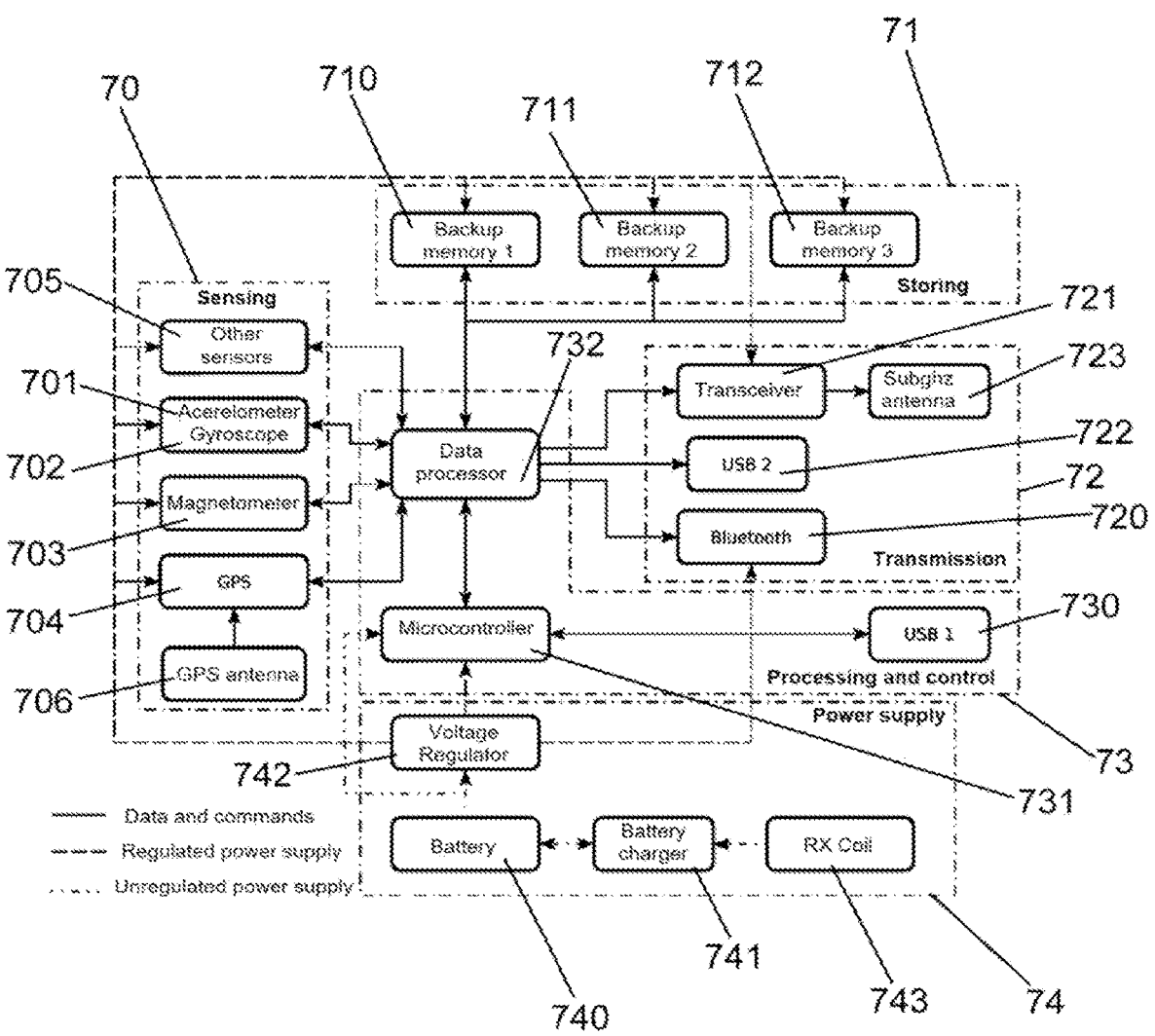
FIG. 7 is a block diagram of the IoT sensor module of the firearm.

FIG. 7 presents the block diagram of the IoT sensor module of a firearm. The device comprises five functional blocks:

Sensing Block 70—this block is responsible for collecting all the physical variables of interest through the corresponding sensors. It is made up of a set of sensors (accelerometer 701, gyroscope 702, magnetometer 703, GPS 704 and other sensors 705) who work independently. They communicate with the data processor through standard, as well as independent, serial digital interfaces, such as SPI or I2C.

The sensing block has a GPS antenna 706 to provide the functionality of obtaining positioning 800 data.

Storage Block 71—this block is responsible for storing the processed data to guarantee error-free storage. This system is made up of non-volatile memories 710, 711, 712, such as Flash or Ferroelectric memories (FRAM), which have been tripled to minimize the probability of errors in data storage.

Transmission Block 72—this block is responsible for transmitting the data stored in the device of the firearm to the device of the holster. This block ensures communication between the device of the firearm and the holster over a very large range, in order to be able to track the position and the basic activities performed with the firearm (if it is fired, if it is reloaded, etc.). This block is made up of three complementary communication elements that allow the required tasks to be fulfilled:

A low energy Bluetooth transceiver 720 that communicates in an ongoing manner the device of the firearm with that of the holster while it is being handled by the user. This transceiver transfers data about the firearm (orientation, use, etc.) in real time. This protocol is used due to its physical range thereof (up to 10 m), low power consumption (1 mW) and high transfer rate (1 Mbit/s).

A Sub-GHz transceiver 721 that communicates the firearm device when the firearm is out of range of the user. This transceiver periodically transfers relevant data from the firearm (position, movement speed, use, etc.). This protocol is used due to its physical range thereof (up to 15 km).

The transmitting block features a Sub-GHz antenna 723 to provide the functionality of Sub-GHz transmission.

A USB module 722 that communicates the firearm device when the firearm is returned to the repository thereof, so that the data stored in the memories of the IoT sensor modules can be downloaded.

Processing and control 73—this block is responsible for managing the initialization of the device subsystems and processing the data acquired by the sensors. This block guarantees the integrity of the logged data by minimizing the effects of errors and the possibilities of modifying the data. These goals are achieved by organizing and encoding the logged data with an error detection and correction code and then encrypting the data so that it can only be decrypted by the users of the system.

This block is made up of two elements:

A microcontroller 731 which is responsible for initializing the subsystems of the device and managing the available energy resources in order to maximize the amount of data that is logged and transmitted. The microcontroller only has access to a list of system parameters, unknown to the users, and which it is not able to modify. In this way, if the processor were hacked, the intruders would not be able to modify the functioning of the system, which would continue logging data, nor would they modify the data stored.

Figure 10:
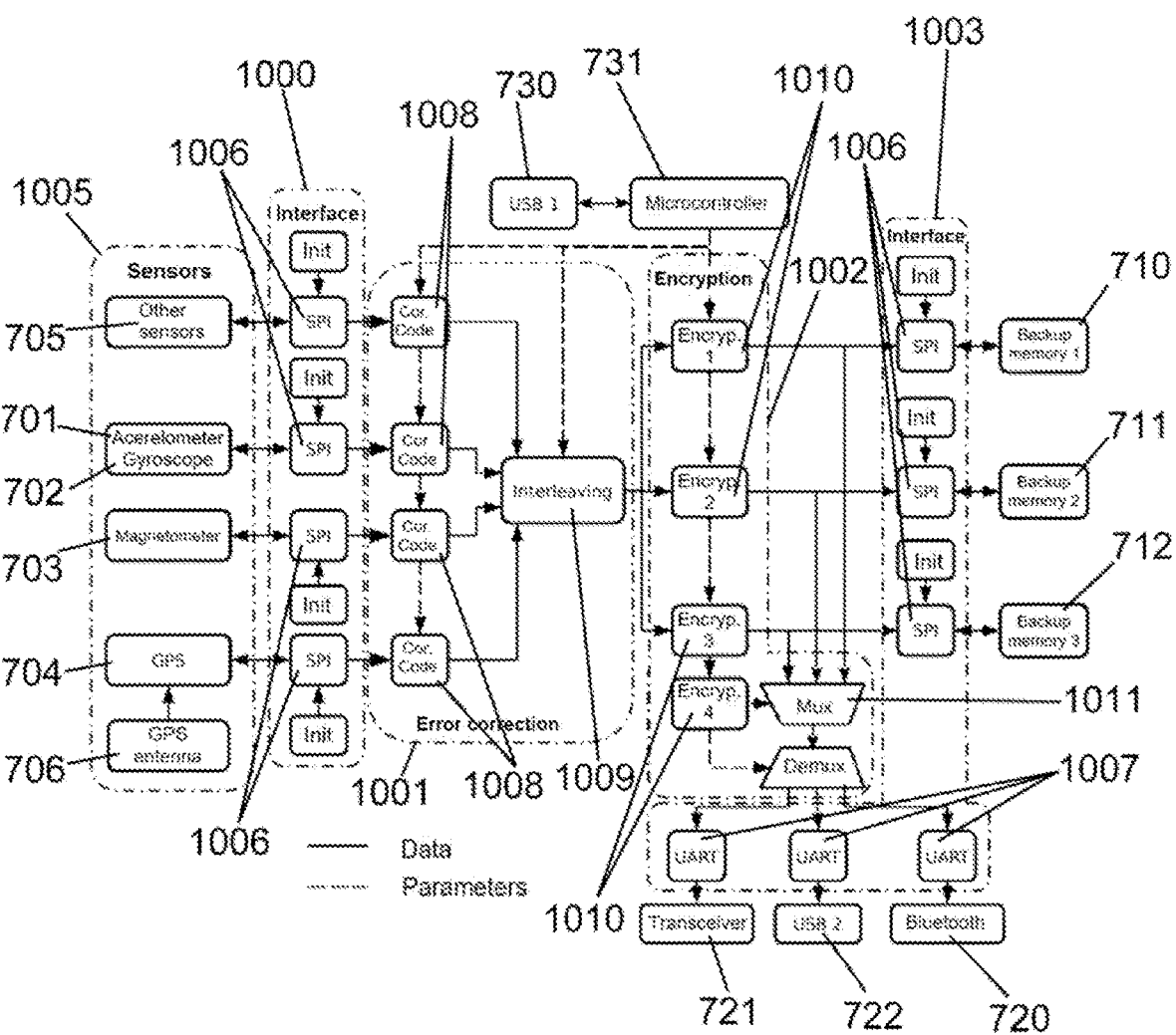
FIG. 10 is a block diagram of the data processing module of the IoT module of the firearm.

A data processor 732 which is responsible for implementing the algorithms that organize and encode the logged data. The algorithms are implemented using algorithmic state machines that are implemented through specific digital circuits, hardware (FIG. 10).

In addition, the processing and control block 73 has a USB configuration port 730 connected directly to the microcontroller 731 that manages the device.

The goal and fundamental idea behind this structure is to isolate the operation of the system from the configuration process, so that even if the device is hacked, the essential data for data processing, storage and transmission is inaccessible. In this way, the possibility of voluntarily modifying the data is minimized and backup copies are preserved that can only be accessed by the users.

Power Supply Block 74—this block is responsible for storing and managing the energy used by the device. It consists of a rechargeable battery 740 the charging of which is managed by a smart battery charger 741. The charger acquires power through inductive coupling. The voltage regulator 742 is a high efficiency one to maximize the use of the energy stored in the battery.

The power supply block features a wireless charging coil 743 to provide the functionality of battery 855 charging by inductive coupling.

Figure 8:
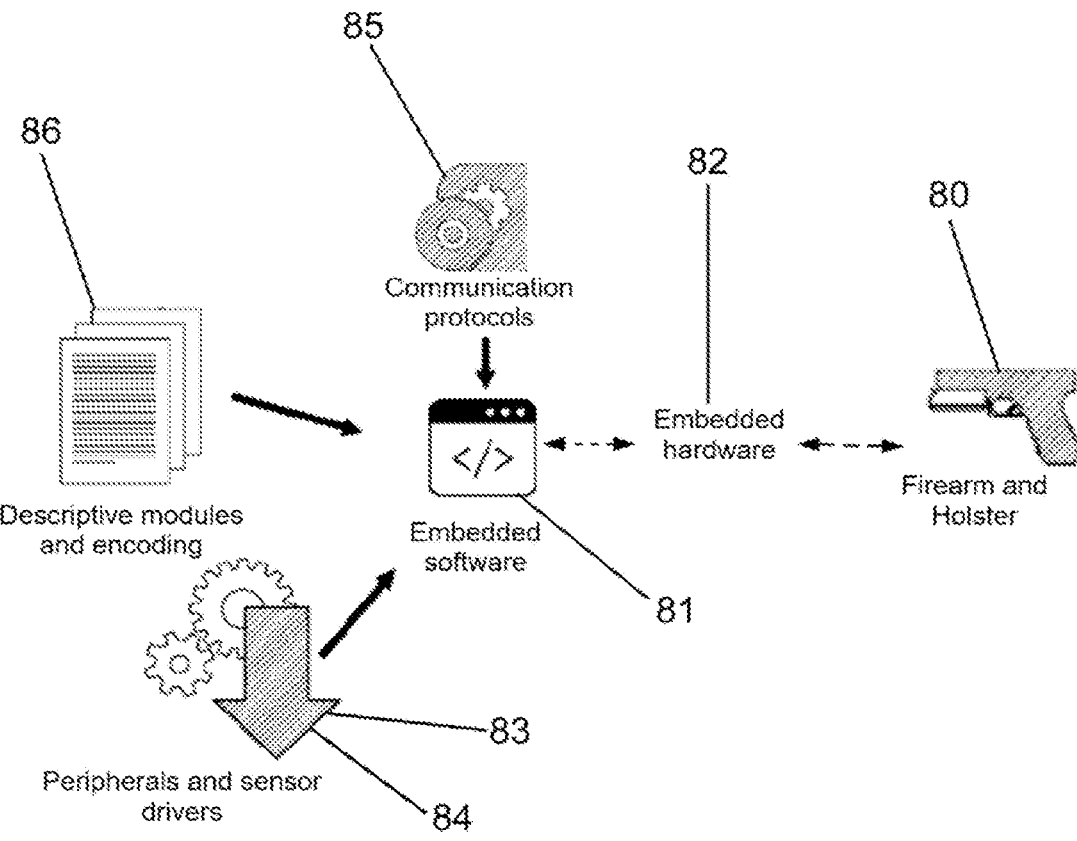
FIG. 8 is a high-level software block diagram of the firearm IoT sensor module system in question.

FIG. 8 presents the high-level software organization of IoT sensor modules. Each IoT sensor module (firearm and holster) 80 is configured with software 81 specifically developed to prevent hacks and intrusions. The software is organized and encoded to consider situations where there are failures of both hardware 82 and software (problems in the memory, the processor or hacks). This software is responsible for managing the resources available in each embedded system (memory, sensors, coprocessors, communications and energy).

Specifically, as FIG. 8 shows, embedded software 81 integrated in the IoT sensor modules is made up of:

Peripheral controllers 83 for components of the MCU
support and sensors 84 of the IoT sensor module;

Communication protocols 85 of the transmission subsystem of the IoT sensor module, which communicates with the router to access the field database, and Power management protocols to maximize the operability of the IoT sensor modules.

The module descriptors and the encoding system 86 of the IoT sensor modules describe the structure, content, dependencies, filtering, and other attributes of the module to collect data using a specific sensor or transceivers computed by the MCU.

Figure 9:
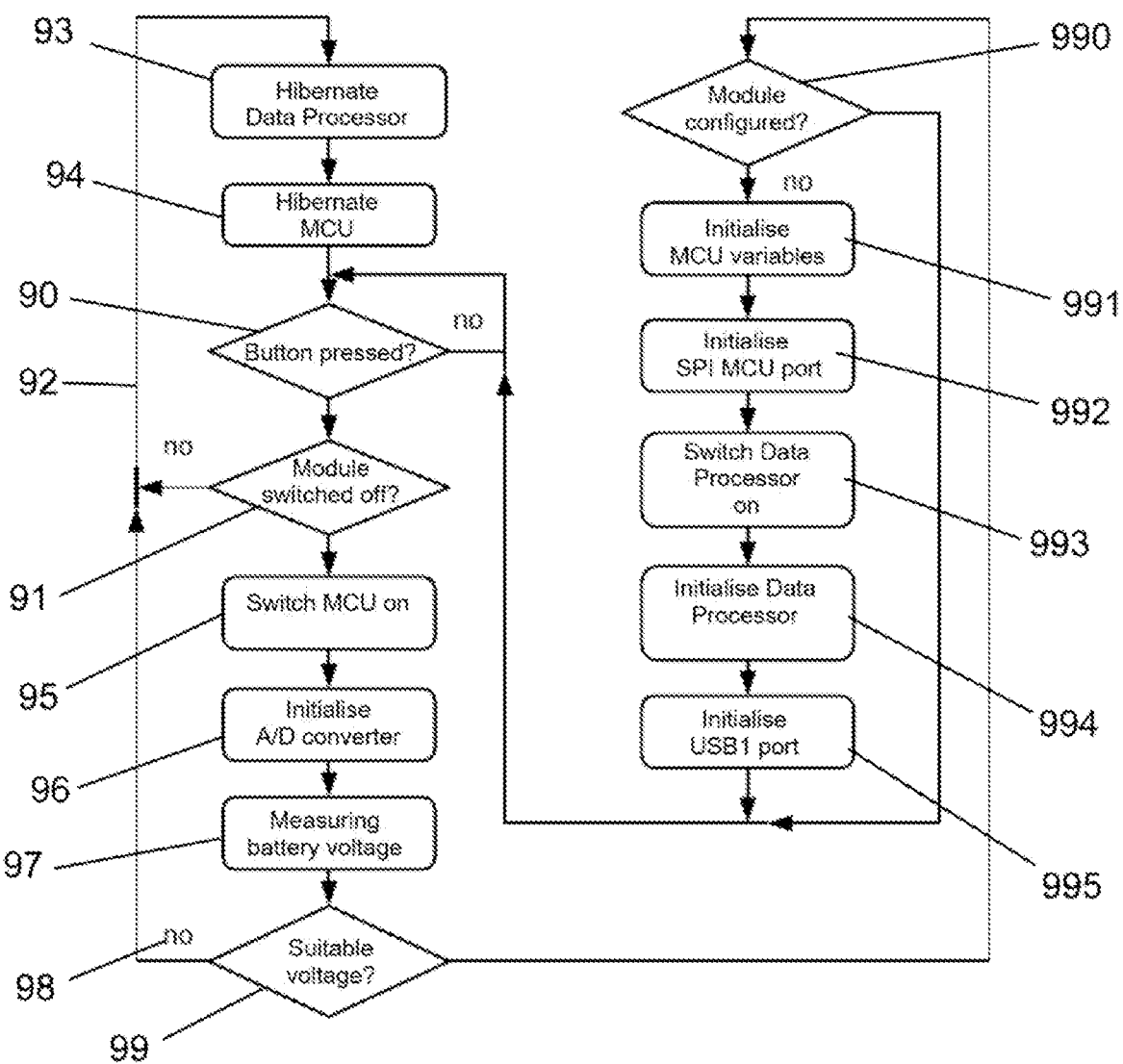
FIG. 9 is a flowchart of the initialization routines of the IoT module of the firearm.
Figure 11:
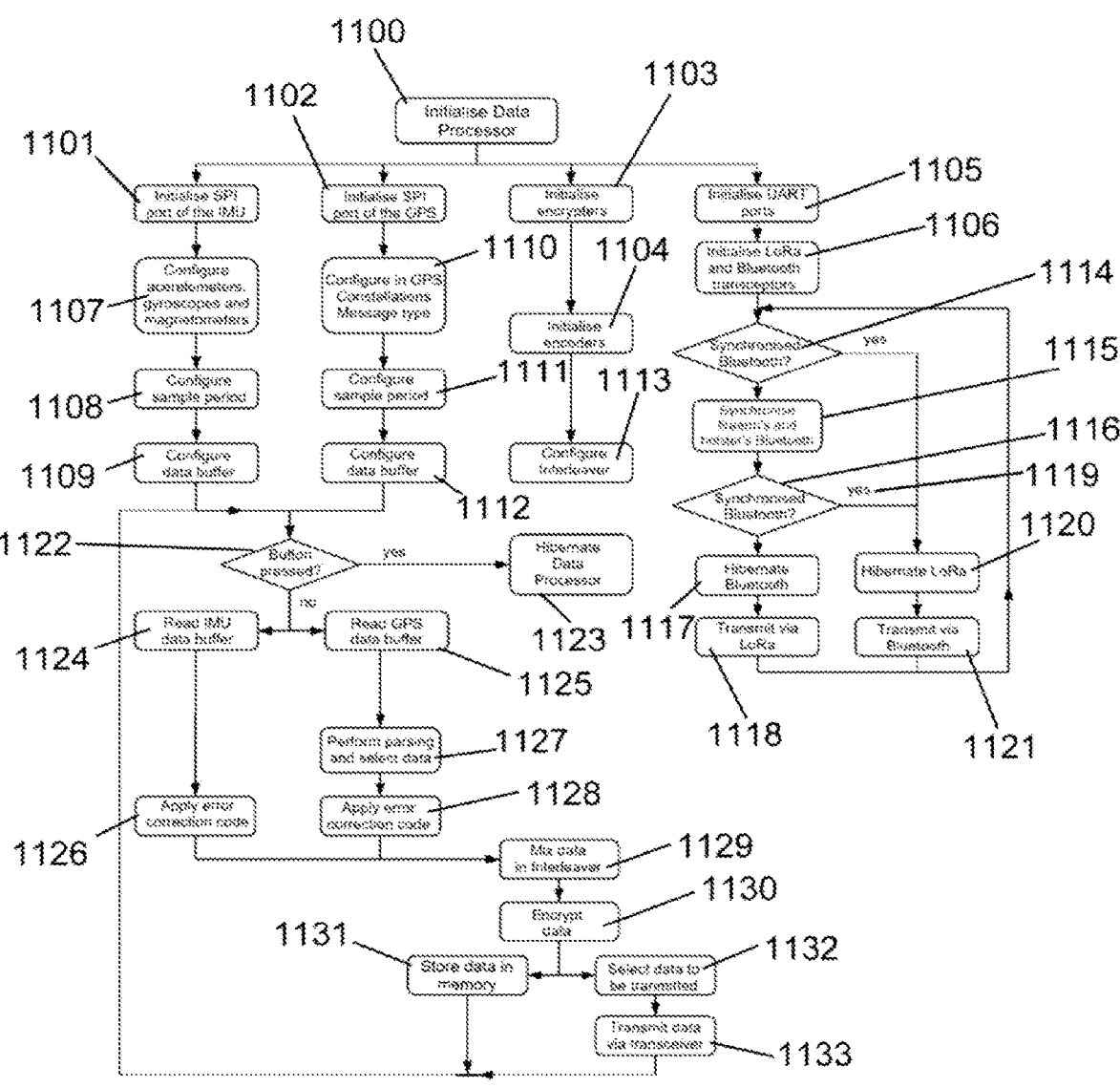
FIG. 11 is a flowchart of the operations performed by the data processing module.

FIGS. 9 and 11 present the flow diagrams of the initialization and operation routines of the IoT module of the firearm.

The switching on and initialization process of the IoT sensor module of the firearm begins when the firearm is removed from the holster (FIG. 9). At that moment, the preset sequence of activation of the switches is detected 90. Then it is verified whether the module is off 91 so as to proceed to switch on the same. If it is working 92, the data processor 93 and the microcontroller 94 (MCU) are hibernated in order not to lose the previous configuration, only resetting the elements of the encryption block, accelerating the start of data logging and transmission. Otherwise, all components of the IoT sensor module are initialized.

Specifically, when the module is switched on, the microcontroller 95 is switched on, an A/D converter 96 is initialized and battery voltage 97 is measured, wherein in the event that it is not suitable 98 the data processor 93 and the microcontroller 94 are hibernated. If the voltage is suitable 99, a verification about whether the module is configured 990 takes place and, if not, the microprocessor variables 991 are initialized, the SPI port of the microcontroller is initialized 992, the data processor 993 is turned on, the data processor 994 is initialized and the USB port 995 is initialized.

The data processing module of the IoT sensor module of the firearm implements the following method (FIG. 11):

1. The data processor is responsible for initializing and configuring the devices connected thereto (sensors, memories and transceivers) when the system begins operation (booting). This process consists of loading the operational parameters of each of these devices. Specifically, initializing the data processor 1100 causes initialization of the SPI ports of the IMU 1101, the GPS SPI port 1102, encrypters 1103 and encoders 1104, UART ports 1105 and LoRa and Bluetooth transceivers 1106; configuring accelerometers, gyroscopes and magnetometers 1107 in the IMU, sampling period 1108 and data buffer 1109; configuring in the GPS constellation types of messages 1110, sampling period 1111 and data buffer 1112; configuring interleaver 1113; loop check if Bluetooth is paired 1114 and if it is not try to synchronize 1115 the Bluetooth of the firearm and the holster, wherein in the event of not achieving synchronism 1116 Bluetooth 1117 is hibernated and transmission is via LoRa 1118. If synchronism is achieved 1119, LoRa goes into hibernation 1120 and is transmission is via Bluetooth 1121.

2. Once the devices have been initialized, the registration system of the firearm proceeds to read the data available in the accelerometer, gyroscope and magnetometer, as well as any other sensor of interest. The GPS is only read if the firearm loses connection with the logging system of the holster, which means that the user does not have the firearm in their possession. In this situation, the reading frequency of the sensors is reduced in order to maximize the operational period of the logging system of the firearm.

Specifically, after the system devices are initialized and the devices connected thereto are configured, it is checked whether the button is pressed 1122, wherein if so, the data processor 1123 is hibernated and, if not, the data buffer from the IMU 1224 is read and the GPS data buffer 1125 is read.

3. Once the sensors have been read, the data processor proceeds to carry out an individual encoding of the data from each sensor to correct any possible errors that may occur during transmission and storage. The Corrector Code blocks (Cor. Code of FIG. 10) are responsible for performing this task. Any of the corrective codes available in the literature can be used (Kadel, R.; Paudel, K.; Guruge, D. B.; Halder, S. J. Opportunities and Challenges for Error Control Schemes for Wireless Sensor Networks: A Review. Electronics 2020, 9, 504. https://doi.org/10.3390/electronics9030504; Alabady, S. A., Salleh, M. F. M., & Al-Turjman, F. (2018). LCPC error correction code for IoT applications. Sustainable Cities and Society, 42, 663-673); preferably the Hamming code is used in the present invention because it is simple to implement and provides good performance in terms of detection/correction-algorithmic complexity.

Specifically, an error detection code 1126 is applied to the data read from the IMU data buffer. For the data read from the GPS data buffer, a syntactic analysis of the same and data selection 1127 is first carried out and then an error correcting code 1128 is applied.

4. Once the data from each sensor is encoded, data interleaving 1129 is performed, generating a sequence of interleaved data. The goal of interleaving is to overcome the rapid fading caused during transmission of signals over the air. The interleaving code rarely works to correct error codes caused by slow fading, because slow fading can result in long, consecutive error codes, the entire frame may even be an error. Therefore, consecutive error codes will occur after de-interleaving.

5. Once the data has been protected against hardware and transmission errors, the confidentiality of the data is protected through encryption 1130 of the same by encrypting them. Encrypting blocks (Encryp. From FIG. 10) are those which are responsible for this task. Any of the encryption techniques available in the literature can be used; preferably the present invention, but for the application described a symmetric encryption technique is used with a 128-bit long key. To improve the robustness of the system, the data to be transmitted and stored is encrypted with three different keys.

6. The resulting data sequences are stored 1131 in the three backup memories available in the device. (FIGS. 7 and 10).

7. The resulting data sequences are also transmitted 1133 through any of the available transceivers in the system. When operating normally, the transmission is performed through the Bluetooth transceiver, providing a limited range (connects the firearm system with the holster system) at maximum transfer speed. In this mode of operation, the objective is to accurately know the movements and positions of the firearm within a limited time window. When the firearm is not within reach of the user, the transmission is performed through the Sub-GHz transceiver, providing a very wide range (of the order of several kilometers) but at a low transfer speed. In this last mode, the important thing is to know where the firearm is, in addition to the basic movements it makes.

8. To increase the safety of data transmission, the transmitted sequence is randomly chosen 1132 from the generated sequences. The transmitted sequence is chosen by randomly selecting 2 bits from a 64-bit random number, which select the generated sequence.

This is the method that the logging device of the firearm executes during normal operation. The device also implements a method that allows the safe download of the data stored therein and the configuration thereof through USB ports.

The configuration port (USB 1), the connectors of which are installed on the PCB boards of the embedded systems, only accessible when the firearm and/or the holster are disassembled, is directly connected to the microcontroller that manages the device. The microcontroller has no data about the parameters used by the data processor to encode and encrypt the data, it can only choose one of a set of parameters stored in the processor, so that even if someone can access the control of the microcontroller (hacking) they will never be able to access the operational parameters, which makes unauthorized access to the logged data (FIG. 7) difficult.

The download port (USB 2), the connectors of which are installed on the PCB boards of the embedded systems, only accessible when the firearm and/or the holster are disassembled, is connected to the memories through the data processor (FIG. 10), isolating the data management system from the device management system. In this way, the effects of unscheduled intrusions to the device are minimized. The data stored in the memories is not erased, so even if firearm is accessed, the data cannot be erased.

FIG. 10 presents the block diagram of the data processor used by the IoT sensor module described above wherein three subsystems are identified:

Interfaces 1000, 1003—these blocks are responsible for communicating the sensors 1005, transceivers and memories with the data processor and are constituted by a set of independent standard serial digital interfaces (SPI 1006, I2C and UART 1007) that communicate with the 975 electronic devices of interest. One interface per device is used in order to introduce redundancy, which minimizes the effects of failures on the general operation of the system and minimizes the frequency of operation by parallelizing tasks. Each of the interfaces has its own initialization system, including the parameters thereof, which is implemented through finite-state machines (automatons).

Error correction 1001—this block is responsible for encoding the data from each sensor with an error correction code 1008 (Cor. Code) and then organize them into a data package (Interleaving) 1009 that guarantees the integrity of the data for a certain amount and type of errors that the system will suffer during the operation thereof. The most important errors for real-time operation are transmission errors, so data organization using interleaving is important. The generation of corrective codes 1008 and the interleaving 1009 are implemented through dedicated circuits, since it allows to optimize the energy consumption thereof.

Corrector codes are chosen based on the efficiency, correctness, and algorithmic complexity thereof. At this point it should be noted that the system will always have backup copies on the device, which can be downloaded through a USB interface (USB 2), which can be used to analyze the situations once they have concluded.

Encryption 1002—once the data package has been organized, it will be protected by encryption thereof. This task is performed through dedicated digital circuits (Encryp) 1010. Its parameters are predefined and stored in tables that are not available to the user. The configuration system (microcontroller) can only determine which of the elements of the table will be used, not its value, so that at no time are the parameters of the algorithms available outside the data processor, strengthening the ability to protect the data.

Since the data is stored in three different memory banks 710, 711, 712, each one of them will have a different encryption, which improves the robustness of the system since if one of the codes is discovered, the other two will continue to be protected. This encrypted data is what is transmitted through the transceivers (LoRa or Bluetooth) or the USB port. The transmitted data package is randomly selected by the circuit constituted by the Encrypt 4 and Mux blocks 1011, in order to add an extra level of safety to the data.

The purpose of the data processor structure is to isolate the processing and transmission of data from the configuration process, so that even if the device is hacked, the essential data for processing, storing and transmission is inaccessible. In this way, the possibility of voluntarily modifying the data is minimized and backup copies are preserved that can only be accessed by the users.

Figure 12:
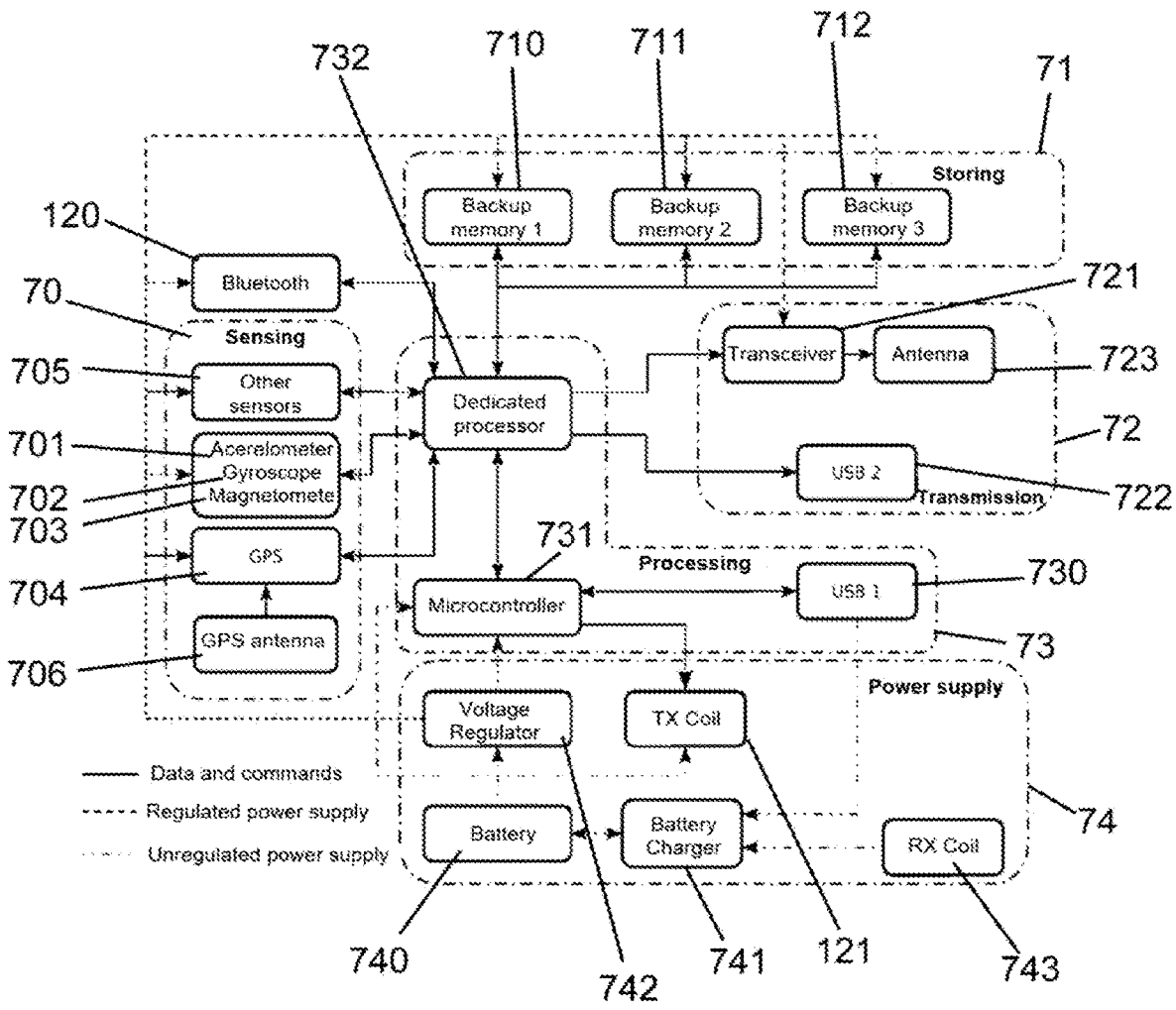
FIG. 12 is a block diagram of the IoT sensor module of the holster.

FIG. 12 presents the block diagram of the IoT sensor module of the holster. It is similar in structure to that of the IoT sensor module of the firearm, differing only in:

A Bluetooth transceiver 120 on the input that it uses to communicate with the IoT sensor module of the firearm;

A magnetic coupling antenna 121 to charge the battery of the IoT sensor module of the firearm; and A more powerful transceiver 122 that enables it to have a greater range due to larger batteries.

The operation, software block diagram and initialization routines are described in FIGS. 7, 8 and 9.

Figure 13:
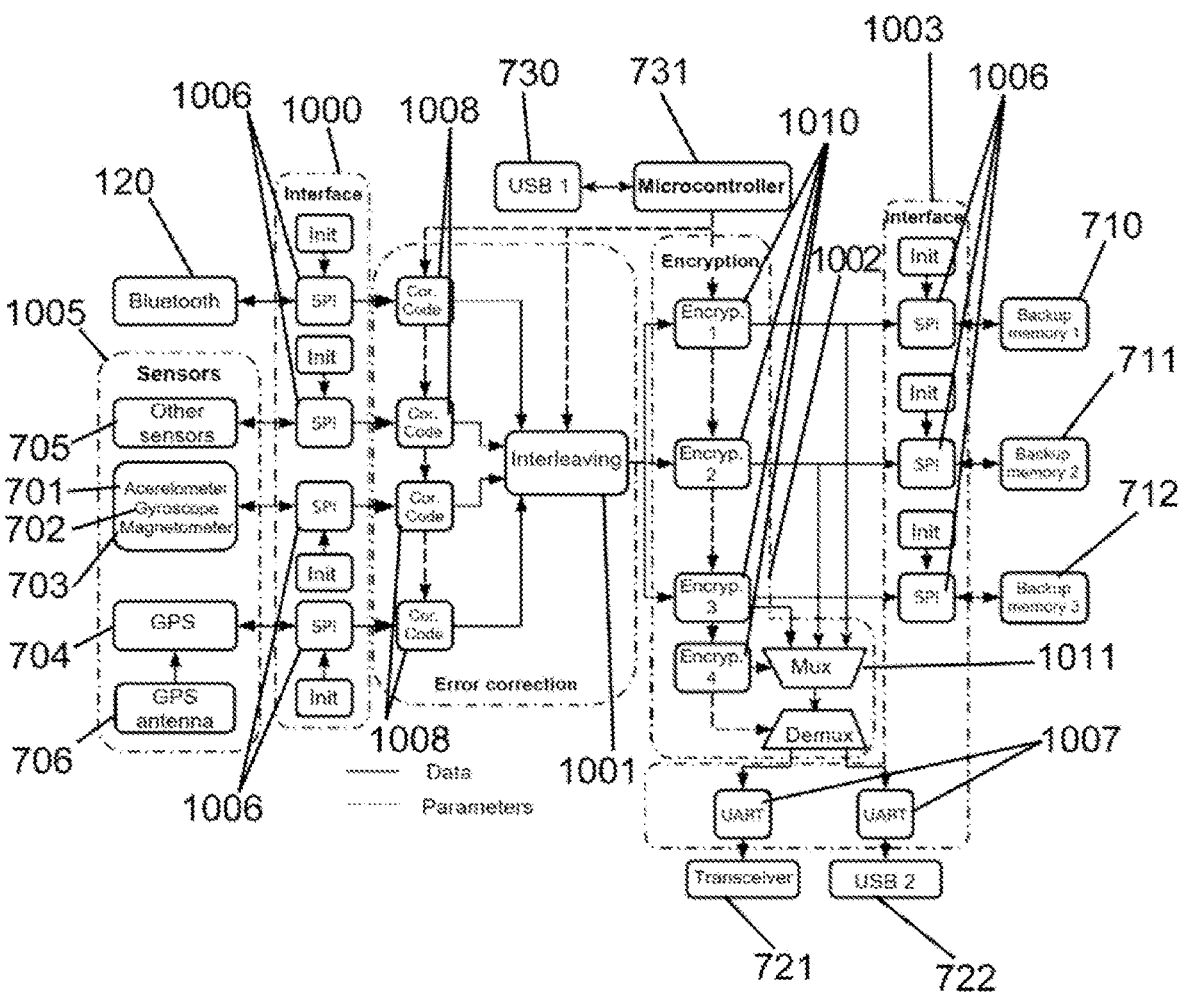
FIG. 13 is a block diagram of the data processing module of the IoT sensor module of the holster.

FIG. 13 presents the block diagram of the data processor used by the IoT sensor module of the holster (FIG. 12). Similar to the block diagram of the IoT sensor module of the holster, the data processor of the holster module has a similar structure to that of the firearm module. This is so because both implement identical algorithms on two different subjects: the IoT sensor module of the firearm logs the data of the firearm while the IoT sensor module of the holster does so with the user of the firearm. The operation is similar, and corresponds to what is described in FIGS. and 11.

In this way, the present invention provides an IoT system for sensing, monitoring, logging and transmitting events that is safely assembled on a firearm and the holster of said firearm. The integrity of the data stored in the firearm and/or in the holster can be used in judicial investigations since the inaccessibility of the data and the integrity thereof are guaranteed.

The invention claimed is:

1. A system for monitoring critical events of a firearm comprising a firearm and a holster for the firearm, the firearm comprising a first Internet of Things (IoT) module to monitor critical events, wherein the first IoT module comprises:

a first sensor module comprising at least:

a first position sensor configured to detect location data; and a first inertial sensor configured to detect acceleration and orientation data;

a first processor module configured to determine a critical event of the firearm from a group of predefined events, based on the data detected by the first sensor module, wherein the group of predefined events comprises at least: firearm drawn and firearm fired;

a first storage module configured to store the data detected by the first sensor module before and after the determined critical event for a preset period of time; and a first wireless communications module configured to transmit the events determined by the first processor module and the data stored by the first storage module; and wherein the holster for the firearm comprises a second IoT module comprising:

a second sensor module comprising at least:

a second position sensor configured to detect location data; and a second inertial sensor configured to detect acceleration and orientation data;

a second processor module configured to determine a critical event of the firearm from a group of predefined events, based on the data detected by the sensor module, wherein the group of predefined events comprises at least: firearm drawn and firearm fired;

a second storage module configured to store the data detected by the second sensor module before and after the determined critical event for a preset period of time; and a second wireless communications module configured to receive communications from the first IoT module and to transmit events determined by the second processor module and the data stored by the second storage module;

wherein the first and second IoT modules are configured to be paired and maintain a communication channel between them.

2. The system of claim 1, wherein the first sensor module further comprises a proximity sensor configured to detect a distancing above a preset threshold from a predetermined storage location of the firearm.

3. The system of claim 1, wherein the first communications module comprises at least one transceiver selected from: Bluetooth and Sub-GHz.

4. The system of claim 1, wherein the first communications module further comprises at least one transceiver selected from: Lora and Wi-Fi.

5. The system of claim 1, further comprising a remote central server, wherein the wireless communication modules of the firearm and the holster are configured to establish a first low-power, high-speed communication between them, so that the communications module of the firearm transmits the events determined by the first processor module and the data stored by the first storage module to the communications module of the holster, which, through a second wireless communication, in turn transmits them to the remote central server together with the events determined by the second processor module and the data stored by the second storage module.

6. The system of claim 1, wherein at least one of the first IoT module and second IoT module comprises a safety module configured to encode, interleave and encrypt the data to be stored in the first and/or second storage module.

7. The system of claim 1, wherein at least one of the first sensor module and second sensor module comprises at least one sensor selected from: accelerometer, gyroscope, magnetometer and GPS.

8. The system of claim 1, wherein at least one of the first storage module and second storage module comprises three non-volatile backup memories 710, 711, 712.

9. The system of claim 1, wherein the first and second IoT modules each comprise a power module with battery recharge by inductive charging.

10. A method for monitoring critical events of a firearm by means of a first Internet of Things (IoT) module that is coupled to the firearm, wherein the method comprises the steps of:

detecting, by means of a location sensor of the first IoT module, location data of the firearm;

detecting, by means of an inertial sensor of the first IoT module, acceleration and orientation data of the firearm;

determining, by means of a first processor module of the first IoT module, a critical event of the firearm from a group of predefined events, based on the data detected, wherein the group of predefined events comprises at least: firearm drawn and firearm fired;

storing, in a first storage module, the data detected by the sensors before and after the determined critical event during a preset period of time;

transmitting the events determined by the first processor module and the data stored by the first storage module; and initiating pairing of the first IoT module with a second IoT module coupled to a holster of the firearm and, in the event that said pairing is not completed, directly transmitting the data from the first IoT module to a central server through a communication to select between: LoRa, SigFox, Z-Wave, Haystack, NarrowBand IoT, Narrowband Fidelity, Ultra Narrow Band and/or cellular network.

11. The method of claim 10, wherein detecting the location data of the firearm, further comprises logging, by means of a wireless communications module of the first IoT module, at least one available wireless network to select between WiFi, Bluetooth and LoraWan to complete the location data of the firearm.

12. The method of claim 10, further comprising encoding, interleaving and encrypting, by means of a first safety module, the data to be stored in the first storage module.

13. The method of claim 10, wherein data encoding comprises using a Hamming code.

14. The method of claim 10, wherein data encryption comprises performing symmetric encryption with a 128-bit long key with three different keys that change periodically.

15. The method of claim 10, wherein, in the event of completing the pairing, it further comprises transmitting the data from the first IoT module to the second paired IoT module through a low-power high-speed communication between them.

16. The method of claim 15, further comprising transmitting the data from the first IoT module to the central server from the second IoT module.

17. The method of claim 16, further comprising:

detecting, by means of a second location sensor of the second IoT module, additional location data;

detecting, by means of a second inertial sensor of the second IoT module, additional acceleration and orientation data;

determining, by a second processor module of the second IoT module, a critical event of the firearm among a group of predefined events, based on the data detected, wherein the group of predefined events comprises at least: firearm drawn and firearm fired;

storing, in a second storage module, the additional data detected by the sensors before and after the determined critical event during a preset period of time; and transmitting the events determined by the second processor module and the additional data stored by the second storage module to the central server.

18. The method of claim 15, wherein in the event of detecting a pairing loss, further comprises transmitting the data from each one of the IoT modules to the central server independently.

\* \* \* \* \*